United States Patent
Ashwin et al.

(10) Patent No.: US 7,318,075 B2
(45) Date of Patent: Jan. 8, 2008

(54) ENHANCED TABULAR DATA STREAM PROTOCOL

(75) Inventors: Shrinivas Ashwin, Sammamish, WA (US); Christian Kleinerman, Bellevue, WA (US); Ganapathy Subramaniam Krishnamoorthy, Issaquah, WA (US); Joel M. Soderberg, Edmonds, WA (US)

(73) Assignee: Microsoft Corporation, Redmond, WA (US)

( * ) Notice: Subject to any disclaimer, the term of this patent is extended or adjusted under 35 U.S.C. 154(b) by 457 days.

(21) Appl. No.: 10/773,724

(22) Filed: Feb. 6, 2004

(65) Prior Publication Data

US 2005/0182800 A1 Aug. 18, 2005

(51) Int. Cl.
*G06F 17/30* (2006.01)
(52) U.S. Cl. .............................. 707/203; 707/4; 707/10; 707/201; 709/217; 709/219; 710/56; 710/61; 715/511
(58) Field of Classification Search ............ 707/1–10, 707/100–104.1, 200–206; 709/217, 219; 710/21, 31–34, 42, 56, 61; 715/511
See application file for complete search history.

(56) References Cited

U.S. PATENT DOCUMENTS 5,412,805 A * 5/1995 Jordan et al. ............... 707/101
5,974,416 A 10/1999 Anand et al.
6,438,582 B1 8/2002 Hsiao et al.
6,718,549 B1 4/2004 Narin et al.

OTHER PUBLICATIONS

Tsuei et al., Database Buffer Size Investigation of OLTP Workloads, 1997, ACM, 112-122.*
Viviane Crestana-Taube et al., Consistent View Removal in Transparent Schema Evolution Systems, 1996, IEEE, 138-147.*
Johnson Thie et al., Optimal protection assignment for scalable compressed images, 2002, IEEE, III-713-III-716.*
L. Liu. Maintaining Database consistency in the Presence of Schema Evolution. In Robert Meersman and Leo Mark, editors, Proceedings of the Sixth IFIP TC-2 Working Conference on Data Semantics, Stone Mountain, Atlanta, 1995, Chapman & Hall, London. 29 pages.
T. Zhou, L. Liu, and C. Pu. Tam: A System for Dynamic Transactional Activity Management. Proceedings of the 1999 ACM SIGMOD Conference, pp. 571-573, 1999.

* cited by examiner

*Primary Examiner*—Jean Bolte Fleurantin
(74) *Attorney, Agent, or Firm*—Amin, Turocy & Calvin LLP

(57) ABSTRACT

Systems and methodologies are provided as part of a computing environment that implements an enhanced tabular data stream (TDS) protocol. Such enhanced TDS protocol can mitigate synchronization inconsistencies between client and servers, improve robustness of the data transfer, facilitate password specification as part of login procedures, and reduce administration overhead. Various headers are provided as part of the data stream protocol, and a versioning scheme is established that facilitates proper communication between servers and clients having different release dates and versions of the TDS protocol.

17 Claims, 12 Drawing Sheets

ENHANCED TABULAR DATA STREAM PROTOCOL

TECHNICAL FIELD

The present invention relates generally to features of a Tabular Data Stream (TDS) protocol, and more particularly to systems and methods for improving security, compatibility and synchronization between servers and client drivers that employ the TDS protocol.

BACKGROUND OF THE INVENTION

Advances in computer technology (e.g., microprocessor speed, memory capacity, data transfer bandwidth, software functionality . . . ) have generally contributed to increased computer application in various industries, such that organization of computer systems has changed dramatically. The concept of a large computer center with a single large computer to which all users bring their work is obsolete. Similarly, Data Base Management Systems (DBMS systems) have long since moved from a centralized mainframe environment to a de-centralized or distributed environment. One or more PC "client" systems, for instance, can be connected via a network to one or more server-based database systems (SQL database server). Known examples of computer networks include local-area networks (LANs) where the computers are geographically close together (e.g., in the same building), and wide-area networks (WANs) where the computers are farther apart and are connected by telephone lines or radio waves.

Often, networks are configured as "client/server" networks, such that each computer on the network is either a "client" or a "server." Servers are powerful computers or processes dedicated to managing shared resources, such as storage (e.g. disk drives), printers, modems, or the like. Servers are often dedicated, meaning that they perform no other tasks besides their server tasks. For instance, a database server is a computer system that manages database information, including processing database queries from various clients. The client part of this client-server architecture typically comprises PCs or workstations which rely on server(s) to perform operations. Typically, a client runs a "client application" that relies on a server to perform some operations, such as returning particular database information. Over such networks various protocols that transport information according to specifications, while at the same time accompany other request-response protocols have emerged.

One such protocol is the TDS protocol, which is a message oriented application level protocol employed for transfer of requests and responses between client and server systems, and can include native support for traditional Structured Query Language (SQL) data types, such as character (char), variable-length character (vchar), binary (blob), date-time, time stamp, together with some support for vendor-specific data types. In systems employing TDS it is typical for a client, such as a user or application program, to establish a long-lived connection with a server, such as a database system. Upon a successful hand shake and establishment of the connection via any suitable supported transport/session level protocol, a complete message is sent from client to server after which a complete response is sent from server to client.

Generally, some prior versions of the TDS protocol were not adapted to designate whether down level clients and new clients can communicate with down level servers or new servers. In addition, various requirements of the protocol could typically create potential inefficiencies in utilizing a system's resources. For example, to send large values in the form of <length> followed by <stream of bytes> can require computation, and allocation of a CPU memory, which could have other wise been employed for completion of higher priority tasks. As another example, during a re-set operation the client driver typically does not know if the re-set operation had succeeded or not, until the submitted request has been completed. As such, long running requests could imply long wait times to determine whether a re-set operation had succeeded or not, and while the driver was pending confirmation of success of a reset operation, other requests on the same connection were blocked, as it was uncertain whether the connection was usable or not.

At the same time in some cases it can be desirable for a client driver to cancel a command executing in the server without rolling back the current transaction. Likewise, it can be desirable to reduce administration over head when employing a TDS protocol in a network environment. For example, having administrators assigned to resetting user expired passwords can increase costs and reduce productivity.

Therefore, there is a need to overcome deficiencies associated with conventional systems.

SUMMARY OF THE INVENTION

The following presents a simplified summary of the invention in order to provide a basic understanding of one or more aspects of the invention. This summary is not an extensive overview of the invention. It is intended to neither identify key or critical elements of the invention, nor to delineate the scope of the present invention. Rather, the sole purpose of this summary is to present some concepts of the invention in a simplified form as a prelude to the more detailed description that is presented hereinafter.

The present invention provides for an enhancement of a Tabular Data Stream (TDS) protocol that can be employed for client/server communication networks. As part of such enhanced protocol, various systems and methods are provided for versioning and supporting a Multiple Active Result Sets (MARS) feature, which can include a data field header, for example. Such a data field can identify to servers a number of pending requests known by clients, and facilitate query synchronization, regardless of buffer sizes employed in the client-server communications network. Other aspects of the enhanced TDS protocol according to the present invention can facilitate query execution and administration aspects (e.g. password regulation) for such networks.

A versioning scheme of the present invention accounts for chronological versioning of TDS components (e.g. release dates), as well as software versioning (e.g. protocol version), and negotiates down to a common version between the client and the server side. Such scheme can facilitate instant determination of a protocol version that is common between the client and the server, so that both down level clients and new clients can communicate with both down level servers and new servers, for example. Accordingly, background compatibility between the server and client can be improved when changes occur to implemented versions of the TDS protocol.

Another aspect of TDS protocol of the present invention improves consistency of behavior on server side, e.g. when server commits transactions. Initially, and as part of a header field, client can send to server number of pending requests known to client driver. In case server already has completed processing of previous requests, such number reported by client helps synchronize and coordinate a view of the number of requests currently pending therebetween. Such can typically mitigate inconsistent server behavior related to instances wherein buffer zones are waiting to be read by the client. For example, a typical inconsistent behavior can arise when the client executes a query, the server performs and the results remain in a network buffer waiting to be read by the client.

In a related aspect according to the present invention, query notification headers are provided as part of the enhanced TDS protocol. At the time of establishing the query, the server is asked to provide the client with future update results related to the query. As such, a requirement for periodically re-asking the server of any changes to the initial query can be mitigated. Accordingly, the manner of sending such notifications (e.g. channels for sending the notification), as well as the set up for notification is established at the time of the query, and does not require changes to be made on the client side. Moreover, such feature allows creation of middle tier type caches, which can be transparent to the client.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

DETAILED DESCRIPTION OF THE INVENTION

Figure 1:
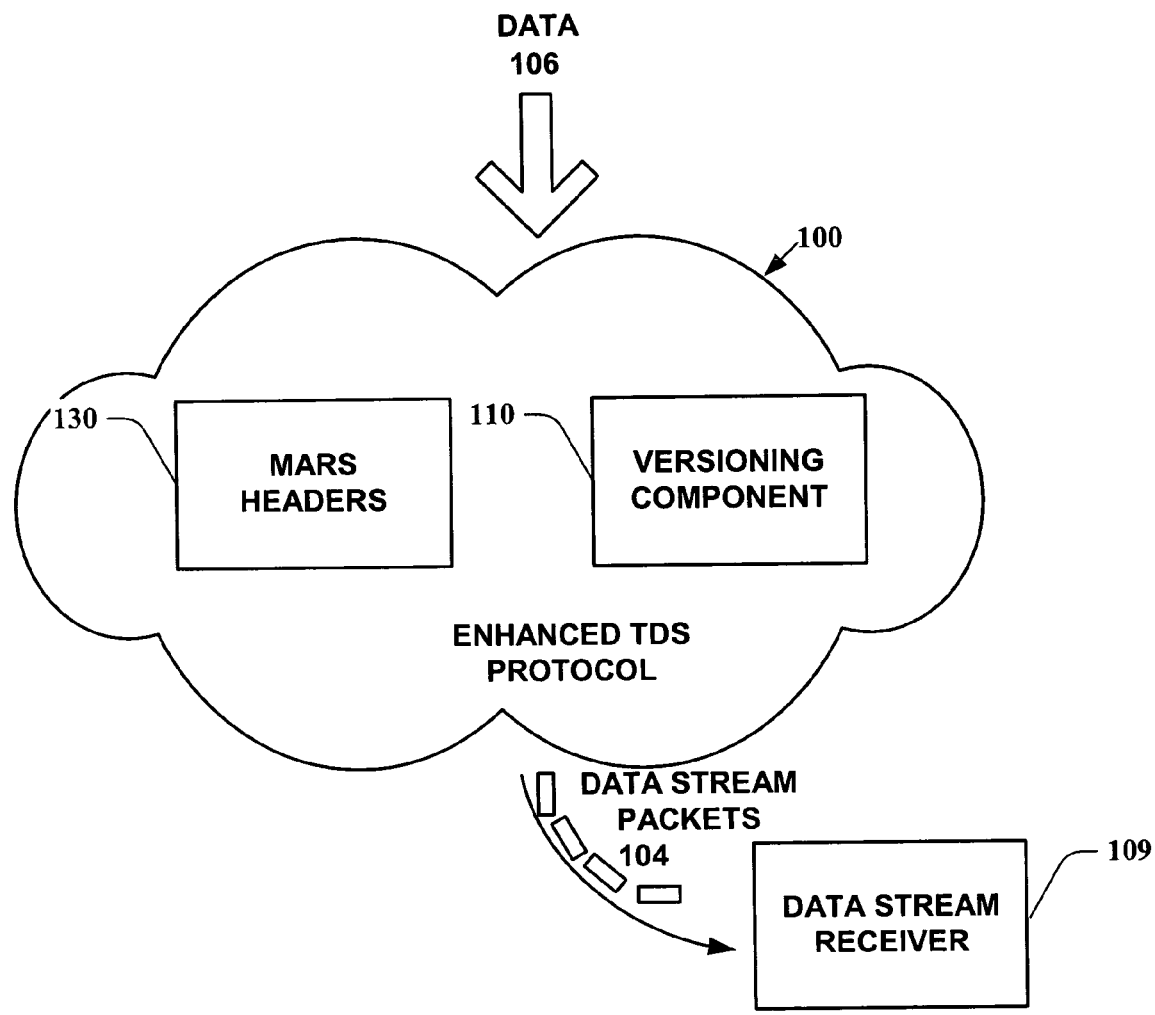
FIG. 1 illustrates a diagram of a TDS protocol according to the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "computer component" is intended to refer to a computer-related entity, either hardware, a combination of hardware and software, software, or software in execution. For example, a computer component may be, but is not limited to being, a process running on a processor, a processor, an object, an executable, a thread of execution, a program, and/or a computer. By way of illustration, both an application running on a server and the server can be a computer component. One or more computer components may reside within a process and/or thread of execution and a component may be localized on one computer and/or distributed between two or more computers.

The present invention provides for an enhanced Tabular Data Stream Protocol with a versioning scheme, annotation of requests, and Multiple Active Results Sets (MARS) headers. Typically, in systems employing TDS, a client, such as a user or application program initiates a handshake with the server and sends a complete message thereto, after which a complete response is sent from server to client. For example, below is a high level description of the messages exchanged between the client and the server to execute a simple SQL statement (e.g. select name from sysobjects where id<2).

| Client: | sql statement |
|---|---|

The server executes the statement and then sends back the results to the client. The data columns being returned are first described by the server and then the rows follow. A completion message is sent after the row data has been transferred.

| Server: | COLMETADATA | data stream |
|---|---|---|
| | ROW | data stream |
| | ROW | data stream |
| | DONE | data stream |

FIG. 1 depicts a schematic block diagram of an enhanced TDS protocol 100 in accordance with the subject invention that facilitates creation of data packet stream(s) 104 from input data 106. A versioning component 110 employs a data character scheme to determine a TDS protocol common to servers and clients that desire establishing communication. The versioning component 110 can enable down level clients and new clients to communicate with both down level servers and new servers. A multiple active rule set (MARS) component 130 of the enhanced TDS protocol 100 provides for various headers as part of: a batch of Structured Query Language (SQL) commands, and Transaction Manager Request and Remote Procedure Calls (RPC) between clients and SQL servers. Such headers can be required for incoming client requests and can specify various items of information, namely; a Transaction Descriptor, and an outstanding request count, which are described in detail infra. A data field (not shown) that is part of the MARS header component identifies a number of pending requests known by a client to a server. The MARS header component 130 synchronizes execution of queries for communication between the client and the server, regardless of buffer size for the client and the server.

Figure 2:
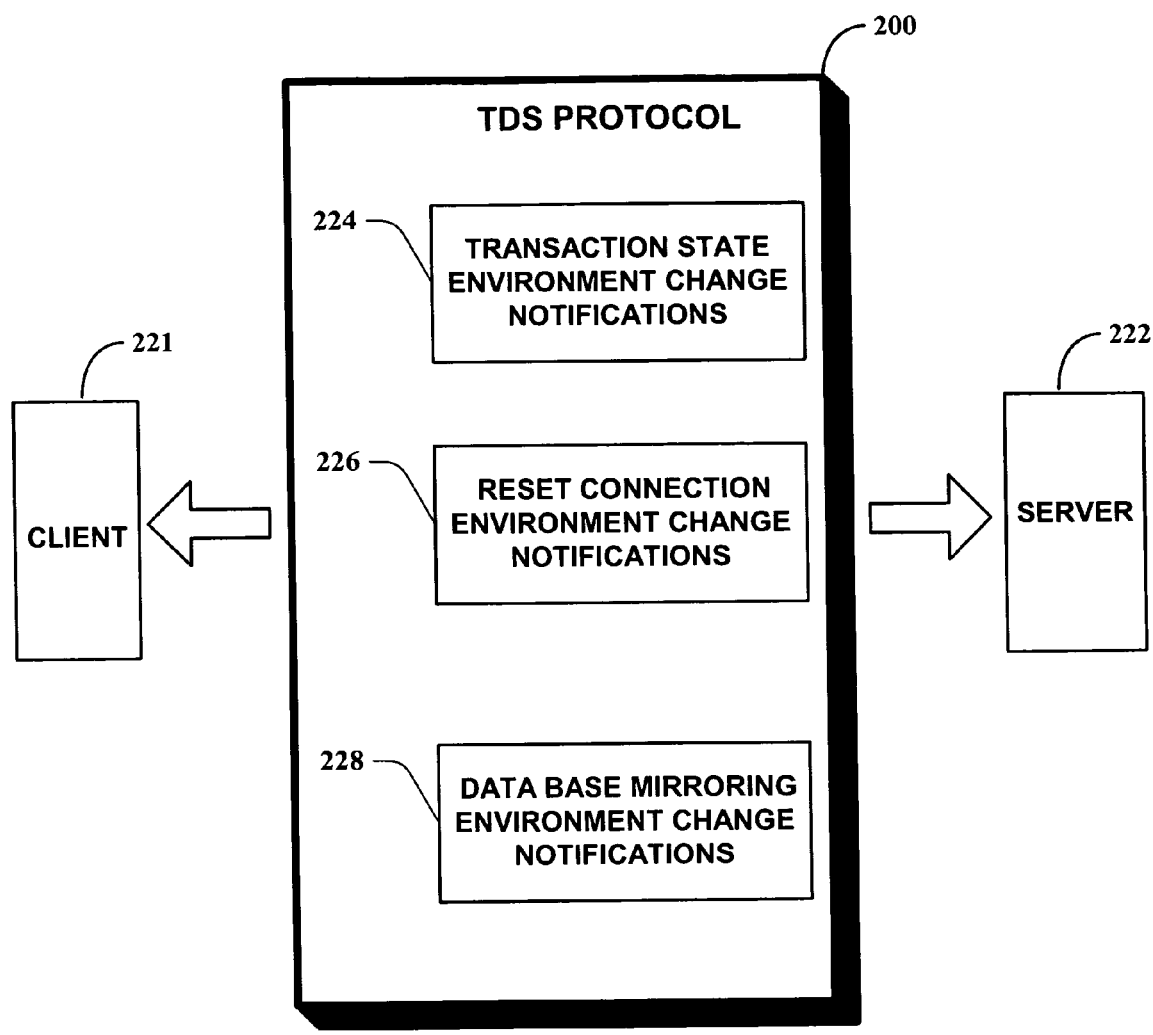
FIG. 2 illustrates a schematic block diagram of a TDS protocol that incorporates various notification headers according to the present invention.

FIG. 2 illustrates a schematic block diagram of a TDS protocol with an environmental change notification feature. As illustrated, the TDS protocol 200 can further comprise environmental change notifications, such as a transaction state component 224, reset component 226, and data base mirroring component 228, which can send back information about a transaction change, when for example a change occurs unknown to a client driver 221, (e.g. when the client driver is bypassed). As such, synchronization between the client driver 221 and a server 222 can be facilitated, for example via the reset component 226, when a connection is re-set. Accordingly, an Application Programming Interface (API) can correctly reflect state in the server at most any given time. In particular and as described in detail infra, such notifications can be added for transaction events of:, Begin Transaction, Rollback Transaction, Enlist Distributed Transaction Coordinator (DTC Transaction), Defect Transaction, Promote Transaction, Transaction ended, as further described toward an end section of the specification by an exemplary mark up language syntax and semantics of the TDS protocol. In addition, the database mirroring component 228 can be employed as part of a data base mirroring environment (DM), wherein upon failure of the server, the client can transparently connect to a secondary server, whereby an environment change stream is sent to the client driver (ENVCHANGE), e.g. when a user attempts to log on to a database that has failed over. Such returned notification stream contains information about the new server that is serving the specified database. The database mirroring component 228 enables applications and client driver to implement a transparent client redirect, which taken as a whole with DM feature, represents a highly feasible feature for client server communications.

Figure 3:
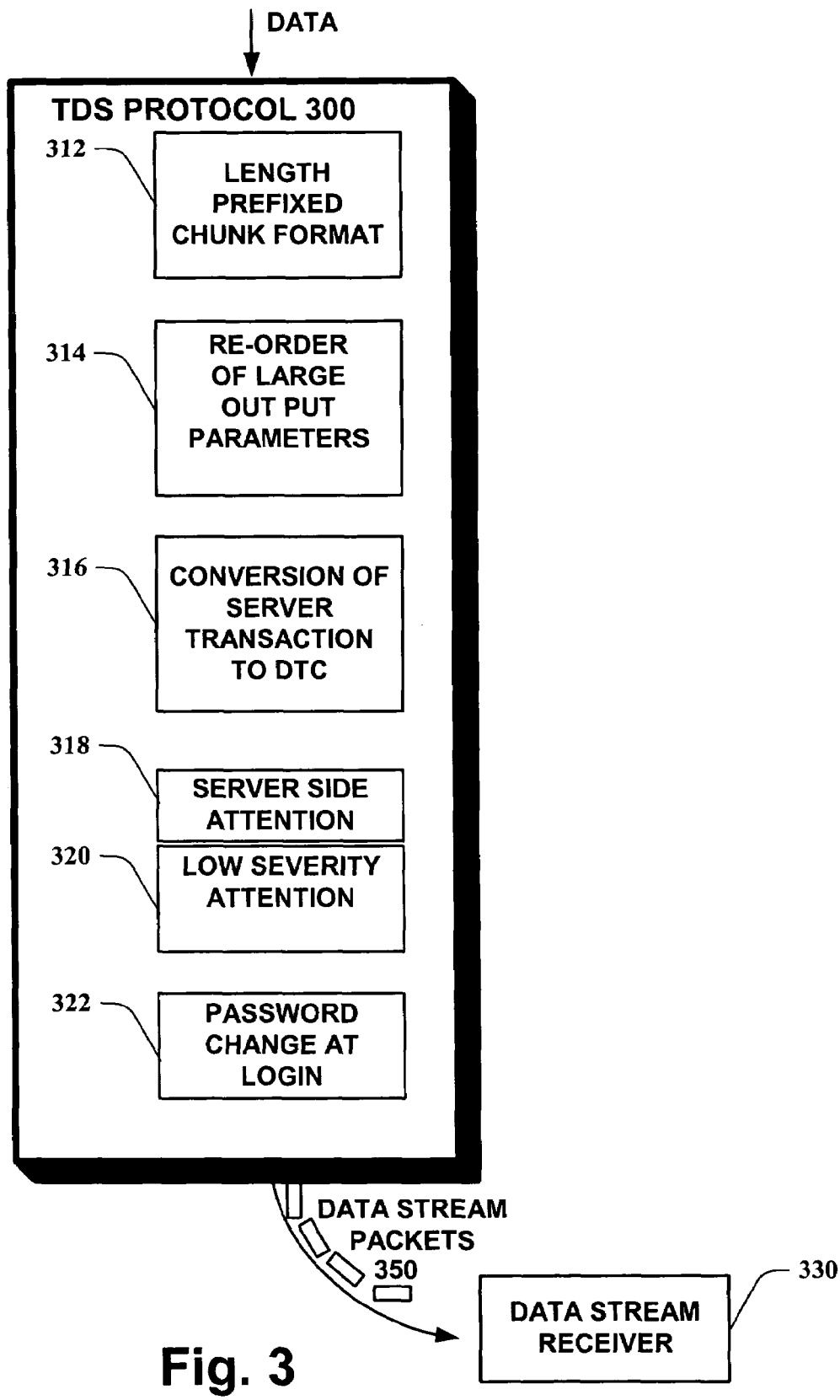
FIG. 3 illustrates another schematic block diagram of a TDS protocol in accordance with various exemplary aspects of the present invention.

Referring now to FIG. 3 various other feature enhancements for a TDS protocol 300 is illustrated, in accordance with an aspect of the present invention. For example, chunk format component 312 can employ a Partially Length Prefixed (PLP) format to transmit large volumes of data, as described in detail infra. Briefly, the chunk format component 312 provides for a special length designator, which can be sent to a data stream receiver 330 (e.g. a client), indicating that length of total value is not known, and that such value can be streamed in several chunks. For example, each chunk can contain a <chunk length> designator followed by <bytes of chunk>, with a specific value reserved for <chunk length> as designation to the receiver 330. Thus, data stream packets 350 can have individual data items that are themselves streams of indeterminate length, and transmittal of large data values is thus facilitated. Moreover, the chunk format component 312 of the TDS protocol 300 provides the receiver 330 with option of additional optimization that can exist as part of the receiver 330. Likewise, a re-order component 314 provides for a re-order of large output parameters in the data stream 350, e.g., small values can be sent first with the large values to follow. Such feature can enable efficient parameter retrieval from the API model, as described in detail infra. Similarly, a conversion component 316 of the TDS protocol 300 is a new transaction manager request of (TM_PROMOTE), as described in detail infra, which can convert a local transaction into a Distributed Transaction Coordinator (DTC) transaction. Such improvement can facilitate application performance, for example in COM+ programming model(s), System Enterprise Services/ System Transactions, wherein transaction services can be provided at component boundaries with several disjoint components co-operating under a same transaction and employing a single SQL Server Resource Manager. In addition, a server side attention component 318 is provided that enables graceful failure of a server side without dropping an established connection. Briefly, a bit is reserved in the TDS header, such that a packet as part of data stream 350 sent from the server to the client can set such bit, indicating to a server side cancellation of a currently executing request. Thus if such bit is set, client drivers can become prepared to abort current requests. As such, internal state of client drivers can generally be reset, and any subsequent protocol packets can be treated as new server side responses with state recreated thereafter. A server side attention component 318 provides robustness to the TDS protocol 300, so that occurrence of exceptions and errors on the server side do not fatally affect entire connection or other requests running there under. Similarly, a low severity attention component 320 provides for an interrupt signal without affecting transaction semantics, and is described in detail with respect to FIG. 10 infra.

A password change component 322 of the TDS protocol 300 specifies a new password as part of a login procedure, when the old password is presented. If a previous password matches, systems employing the TDS protocol 300 can change the password for login. Subsequently, such systems can proceed with logon process and session establishment. Similar to resetting the connection, the password change request component 322 can be achieved by being aligned with, and performed as a function of another request, which is sent out of band from an initial query of the protocol 300. Accordingly, problems associated with locked out administrators, as well as administrators resetting users' expired passwords can be mitigated.

Figure 4:
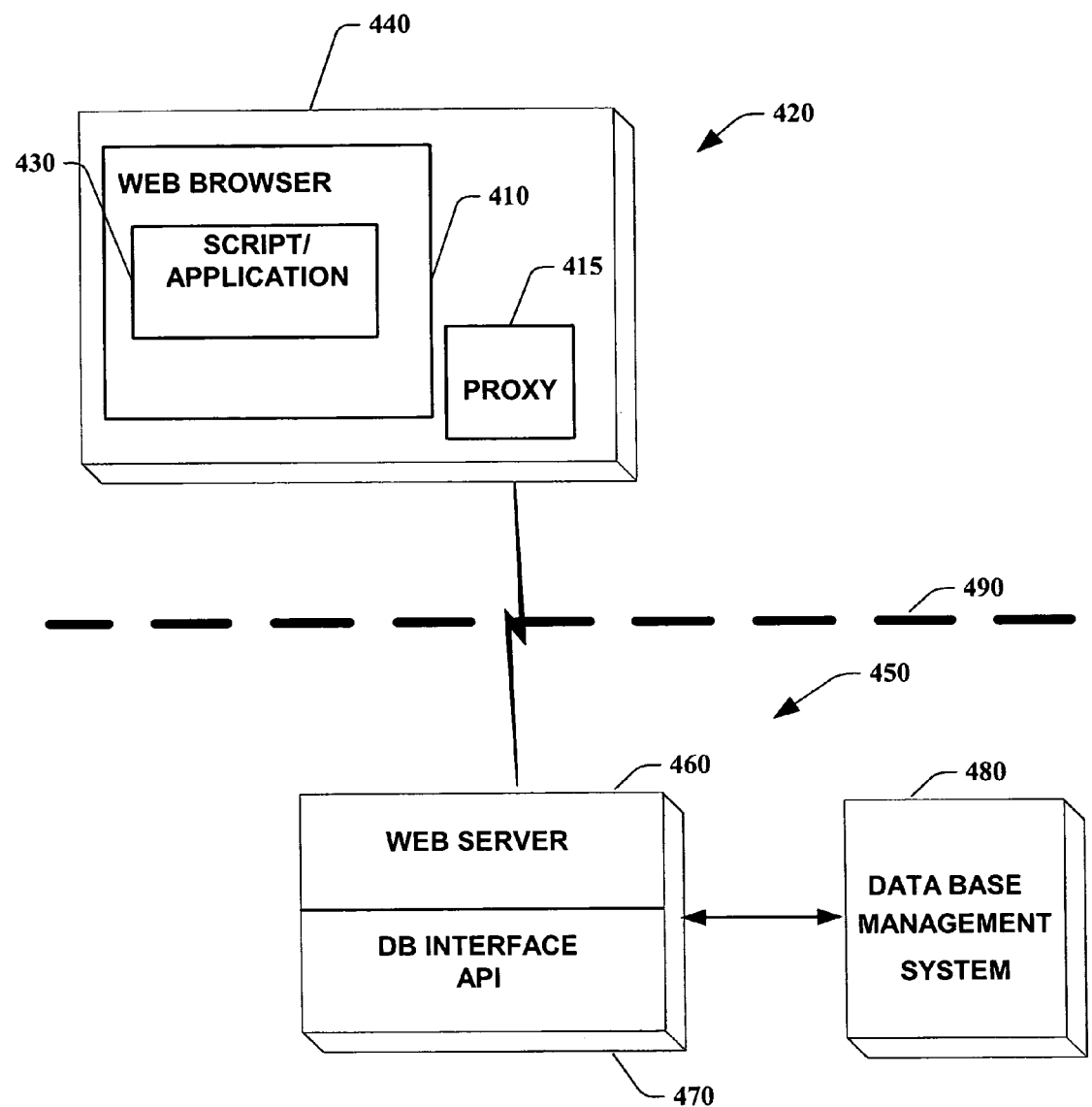
FIG. 4 illustrates a block diagram of a client server network that employs particular TDS aspects of the present invention.

FIG. 4 illustrates a related aspect of the present invention, wherein running on the client 420 is a client process, for example, a web browser 410. Likewise, running on the server 450 is a corresponding server process, for example, a web server 460. In addition, embedded in the Web Browser 410 can be a script or application 430, and running within the run-time environment 440 of the client computer 420, can exist a proxy 415 for packaging and unpacking data packets formatted in accordance with various aspects of the present invention. Communicating with the server 450 is a database management system (DBMS) 480, which manages access to a database (not shown). The DBMS 480 and the database (not shown) can be located in the server itself, or can be located remotely on a remote database server (not shown). Running on the Web server 460 is a database interface Applications Programming Interface (API) 470, which provides access to the DBMS 480. The client computer 420 and the server computer 450 can communicate with each other through a network 490. When the client process, e.g., the Web browser 410, requests data from a database, the script or application 430 issues a query, which is sent across the network (e.g. internet) 490 to the server computer 450, where it is interpreted by the server process, e.g., the Web server 460. The client's 420 request to server 450 can contain multiple commands, and a response from server 450 can return a plurality of result sets. In such communication, session, presentation, and application service elements are provided by TDS. Since TDS does not require any specific transport provider, it can be implemented over multiple transport protocols and the network 490. Responses to client commands that are returned can be self-describing, and record oriented; (e.g. the data streams can describe names, types and optional descriptions of rows being returned.)

On the client side 420 the data can be a login record, or a Structured Query Language (SQL) command being in a language that the server side 450 can accept, a SQL command followed by its associated binary data (e.g. the data for a bulk copy command), or an attention signal. When a connection is desired, the client 420 can send a login data stream to the server. Even though the client 420 can have more than one connection to the server 450, each connection path can be established separately and in the same manner. An exemplary TDS protocol and detailed syntax employed for marking the data is provided at the end section of this specification.

Once the server 450 has received the login record from the client 420 it will notify the client that it has either accepted or rejected the connection request. Likewise, to send SQL command or batch of SQL commands, the SQL command (e.g., represented by a Unicode format) can be copied into the data section of a buffer and then sent to the SQL Server side 420. A SQL batch may span more than one buffer. In addition, various Open Data Base Connectivity (ODBC) routines can cause SQL command to be placed into a client message buffer, or can cause the message buffer to be sent to the server. Such buffer header arrangement according to one aspect of the present invention will be described in detail infra.

In addition, for an SQL command with binary data, the insert bulk operation can represent a case of a SQL command (e.g. in a Unicode format) followed by binary data. Initially, an insert bulk command can be sent to the server 450 in the normal way, and once an acknowledgment is received from the server 450, the client 420 can then send formatted binary data to the server 450. Such functionality can be provided by routines included in the ODBC, in accordance with one exemplary aspect of the present invention. Moreover, the client 420 can initially send an insert bulk SQL statement, followed by a COLMETADATA token, which describes the raw data, followed by Multiple rows of binary data, to the server 450. The data is not formatted in storage engine row format, but rather the format described by the COLMETADATA token. The stream is the same as if the data was being selected from the server 450 rather than being sent to the server 450. One particular TDS protocol and detailed syntax employed for marking the data is provided toward the end section of this specification.

In one aspect of the present invention, when there is desire to execute a remote procedure call on the server 450, the client 420 can send a Remote Procedure Call (RPC) data stream to the server. Such is a binary stream that contains the RPC name, options and parameters. Typically, RPCs can be in a separate message and not intermixed with SQL commands. Additionally, there can be several RPCs in one message.

If an interrupt is desired, the client 420 can cancel a current command by sending an attention signal (also known as out-of-band data). Once the client 420 sends an attention signal, described in further detail infra, the client continues reading until it gets an attention acknowledgment. During the time between sending the attention and receiving the acknowledgment, the client 420 can discard any buffers it receives. An attention request of the present invention can roll back any transactions active in the request's stack. In a related aspect, the client 420 can request that the connection enlist in a Distributed Transaction Coordinator (DTC) transaction. Furthermore, the client 420 can interrupt and cancel a current command without affecting transaction semantics by sending a non severe attention (NSA) signal. Once the client 420 sends an NSA, the client reads until it gets an attention acknowledgment. An NSA cancels a specific request though it does not affect the state of the current transaction. It is noted that an NSA can be sent to the server 450 during the execution of the following stored procedures, when invoked via IPC (interprocess communications) that are numbered on the RPC requests of; Sp_cursor; Sp_cursorfetchnext and Sp_cursoroption. If NSA is sent during execution of any other command or to abort non-ipc invocation, it can be considered a client error and an error flag can be raised. Typically, in other respects the NSA behaves as a regular attention.

Referring now to the server side 450, the data can comprise; a login response, row data, return status of an RPC, return parameters of an RPC, request completion information, error and information or an attention signal as described in detail infra.

The login response can be a token stream consisting of information about server 450 characteristics, optional information and error messages, followed by a completion message. Here, a LOGINACK data stream can include information about the SQL interface and the server's 450 product code and name. If there are any messages in the login response, an ERROR or INFO data stream is returned from server 450 to the client 420.

There can also be a ENVCHANGE data stream if the login changed the environment and the associated notification flag has been set. Moreover, if the database specified for connection in the login packet is participating in real time log shipping, then the corresponding ENVCHANGE can be included as part of the response. A done packet is always present as the final part of the login response. Thus, a DONE data stream is the last thing sent in response to a client 420 login request. Moreover, if the client request results in data being returned, the data can precede any other data streams returned from the server, e.g. Row data is preceded by a description of the column names and data types. When an RPC is executed by the server, the server typically returns a status value. Such can be a 4-byte integer that can be sent via the RETURNSTATUS token. As for the return parameters, the response format for execution of a stored procedure can be identical, regardless of whether the request was sent in SQL or RPC format. For example, such can be a "table response to command" type message.

If the procedure explicitly sends data, then the message can start with one token stream of rows, informational messages and error messages. Such data can be sent in the usual way. Also, when the RPC is invoked, some or all of its parameters can be designated as output parameters. Such features allow RPC parameters to act like variables that are passed by reference. Typically, output parameters can have values returned from the server 450. For each output parameter there can be a corresponding return value, sent via the RETURNVALUE token. The RETURNVALUE stream can also be employed for sending back the value returned by a User Defined Function (UDF), when it is called as an RPC.

Although the end-of-message can be determined by the length field in the buffer header, the client 420 can read results in logical units, and can also determine when all results have been received by examining the DONE data stream. Accordingly, when executing a batch of SQL commands, there can be a DONE data stream for each set of results. All but the last DONE can have the DONE_MORE bit set in the Status field of the DONE data stream. Therefore, the client can typically tell after reading a DONE whether or not there are more results. Likewise, for stored procedures, and for each statement, completion of statements in the stored procedure can be indicated by a DONEINPROC data stream, and a DONEPROC data stream for each completed stored procedure. For example, if a stored procedure executes two other stored procedures, a DONEPROC data stream can signal the completion of each stored procedure. Additionally, besides returning description of row data and data itself, an enhanced TDS protocol according to the present invention can provide a data stream type for the server to send error or informational messages to the client. Such can be the INFO data stream and the ERROR data stream. At the same time, once the client 420 has sent an interrupt signal to the server 450, the client 420 typically can read returning data until the interrupt has been acknowledged. As such, attentions are acknowledged in the DONE data stream or the DONEPROC data stream. An exemplary TDS protocol and detailed syntax employed for marking data is provided toward an end section of this specification.

Figure 5:
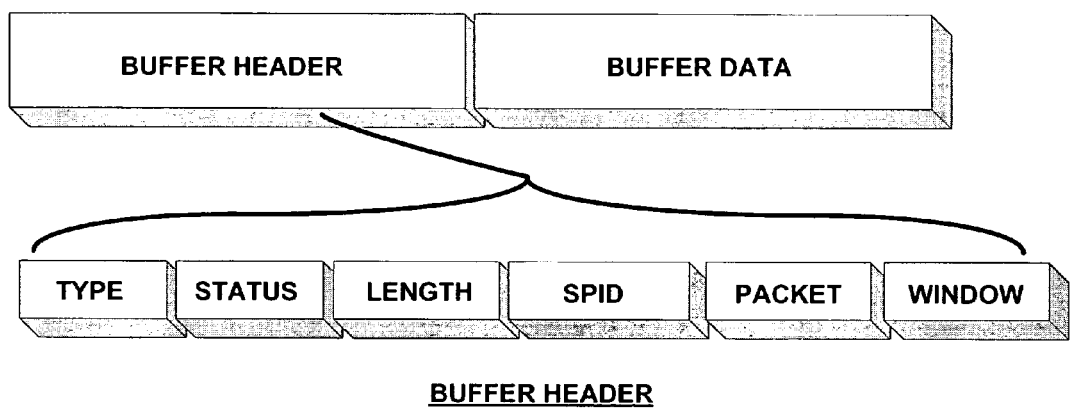
FIG. 5 illustrates an exemplary buffer header arrangement in accordance with an aspect of the present invention.

Referring now to FIG. 5, an exemplary buffer header arrangement in accordance with an aspect of the present invention is illustrated. Typically a buffer is the unit written or read at one time, and can be modeled as a "packet". A message can consist of one or more buffers. A buffer can include a buffer header and is usually followed by buffer data that contains the message. Moreover, each new message can start in a new buffer.

Typically, both the Client and Server will try to read a buffer full of data. They can pick out the header to see how much more (or less) data there is in the communication. When the underlying network interface insists on blocking until all bytes specified in the read have been read, the client can read the header and then determine how much more to read. In one aspect of the present invention and at login time, client can specify a requested "packet" size. Such can identify a size employed to break large messages into smaller "packets". Furthermore, server acknowledgement of changes in the negotiated packet size can be transmitted back to the client via ENVCHANGE streams. Also, for requests sent to the server larger than the current negotiated "packet" size, client typically can send all but the last chunk with a total number of bytes equal to the negotiated size. As such, only the last packet in the request can have an actual number of bytes smaller than the negotiated packet size. If any of the intermediate chunks is not sent at its "maximum capacity" the server disconnects the client when the next chunk arrives.

In a related aspect of the present invention, to implement messages on top of existing and arbitrary transport layers, a buffer header is included as part of the buffer. As illustrated in FIG. 5 a particular example of a buffer header, which precedes all data within the buffer, can be 8 bytes in length. Such buffer header can further include items such as; Type, Status, Length, SPID, Packet and window; as described in detail below.

Type

Type defines the kind of message. Type can be a 1 byte unsigned char. Types can include:

TABLE 1

| Value | Description | Data? |
|---|---|---|
| 1 | SQL batch. This can be any language that the server understands | ✓ |
| 2 | Pre-TDS7 login | x |
| 3 | Remote Procedure Call (RPC). | ✓ |
| 4 | Table response to a command. This indicates a token stream which contains the server response to a client. | ✓ |
| 5 | Unused | |
| 6 | Attention signal | x |
| 7 | Bulk Load data. This type is used to send binary data to the server | ✓ |
| 8 | Non Severe Attention Signal | |
| 9 | Unused | — |
| 10 | Protocol error detected | x |
| 11-12 | Unused | — |
| 14 | Transaction manager request | ✓ |
| 15 | Unused | — |
| 16 | TDS7 login | x |
| 17 | SSPI Message | x |
| 18 | Pre-login Message | x |

For example, the following illustrates a description of a particular message exchange between the client and the server:

```
<<< private_srvproc.h >>>
// Values for type field of SRV_TDSHDR
#define TDS_MT_SQLBATCH        ((BYTE)1)    // SQL batch            Incoming
#define TDS_MT_LOGIN           ((BYTE)2)    // Pre-TDS7 Login       Incoming
#define TDS_MT_RPC             ((BYTE)3)    // RPC                  Incoming
#define TDS_MT_RESULTS         ((BYTE)4)    // Results              Outgoing
                                            // 5 UNUSED in ODS
// #define SRV_TDSUNFORMATTED  ((BYTE)5)    // binary response to cmd
#define SRV_TDSATTENTION       ((BYTE)6)    // attention signal     Incoming
#define SRV_TDSBULKLOAD        ((BYTE)7)    // bulk load data       Incoming
#define SRV_TDS_NS_ATTENTION   ((BYTE)8)    // non severe attention signal
// 9 UNUSED in spec
#define SRV_TDSERROR           ((BYTE)10)   // protocol error detected
// 11 UNUSED in spec
//#define TDS_MT_ECHO          ((BYTE)12)   // echo (currently UNUSED)
// 13 UNUSED in spec
#define TDS_MT_DTC             ((BYTE)14)   // DTC                  Incoming
#define TDS_MT_LOGIN7          ((BYTE)16)   // TDS7 Login           Incoming
#define TDS_MT_SSPI            ((BYTE)17)   // SSPI Message         Incoming
#define TDS_MT_PRELOGIN        ((BYTE)18)   // Prelogin Message     Incoming
#define SRV_MAXTDSTYPE 18
                                            // maximum value of TDS type
```

Status
    Status is a bit field used to indicate the message state. Status is a 1 byte unsigned char. Exemplary status include:

TABLE 2

| Value | Description |
|---|---|
| 0x01 | End of Message (EOM). The last byte in the buffer is EOM. |
| 0x02 | (From server to client) buffer acknowledges the last attention sent<br>(From client to server) ignore this event (0x01 must also be set) |
| 0x04 | Message is part of a batch (From client to server) |
| 0x08 | (From client to server) reset this connection before processing event. Only set by SQL Server 2000 clients, and only for event types Batch, RPC or DTC Request. This asks the server to simulate a logout and a subsequent login before the event, and provides server support for connection pooling. |

```
// Values for status field of SRV_TDSHDR
#define SRV_TDSEOM      ((BYTE)0x01)   // eom
#define SRV_TDSIGNORE   ((BYTE)0x02)   // ignore current message
```

Length
    Length is the size of the buffer including the eight bytes in the buffer header. It is the number of bytes from the start of this header to the start of the next buffer header. Length can be a 2 byte unsigned short int.

SPID
    Spid is the process id on the server, corresponding to the current connection. Such can be useful for identifying which thread on the server sent the TDS packet, and is provided for debugging purposes.

Packet
    Packet is used for numbering message buffers that contain data in addition to the buffer header. Packet is a 1 byte unsigned char. Each time a data buffer is sent the value of tds packet is incremented. Exemplary "Data buffers" can be of following types:

TABLE 3

| Value | Description |
|---|---|
| 1 | SQL batch |
| 2 | Non-SQL Server 7.0 (Sphinx) login |
| 3 | Remote Procedure Call (RPC) |
| 4 | Table response to a command, a token stream |
| 5 | Unformatted binary response to a command |
| 6 | Unused |
| 7 | Bulk Load Data |
| 8-11 | Unused |
| 12 | Echo |
| 13-15 | Unused |
| 16 | SQL Server 7.0 (Sphinx) Login |
| 17 | SSPI |

Window
    Window item can be employed in conjunction with updates to the protocol.
    In a related aspect of the present invention messages that pass between client and the server can typically be one of two types; either a "token stream" or a "tokenless stream". A token stream consists of one or more "tokens" each followed by some token specific data. A "token" is a single byte identifier used to describe data that follows it (e.g. contains token data type, token data length and the like.) Tokenless streams are typically used for simple messages, while messages that can require a more detailed description of the data within it are sent as a token stream. The table below provides an example which messages use token streams and which do not.

TABLE 4

| Message Type | Client or Server Message | Token Stream? |
|---|---|---|
| Login | Client | x |
| SQL Command | Client | x |
| SQL with Binary Data | Client | ✓ |
| Remote Procedure Call (RPC) | Client | ✓ |
| Attention | Client | x |
| Non Severe Attention | Client | x |
| Transaction Manager Request | Client | x |
| Login Response | Server | ✓ |
| Row Data | Server | ✓ |
| Return Status | Server | ✓ |
| Return Parameters | Server | ✓ |
| Request Completion | Server | ✓ |
| Error and Info Messages | Server | ✓ |
| Attention | Server | x? |

Figure 6:
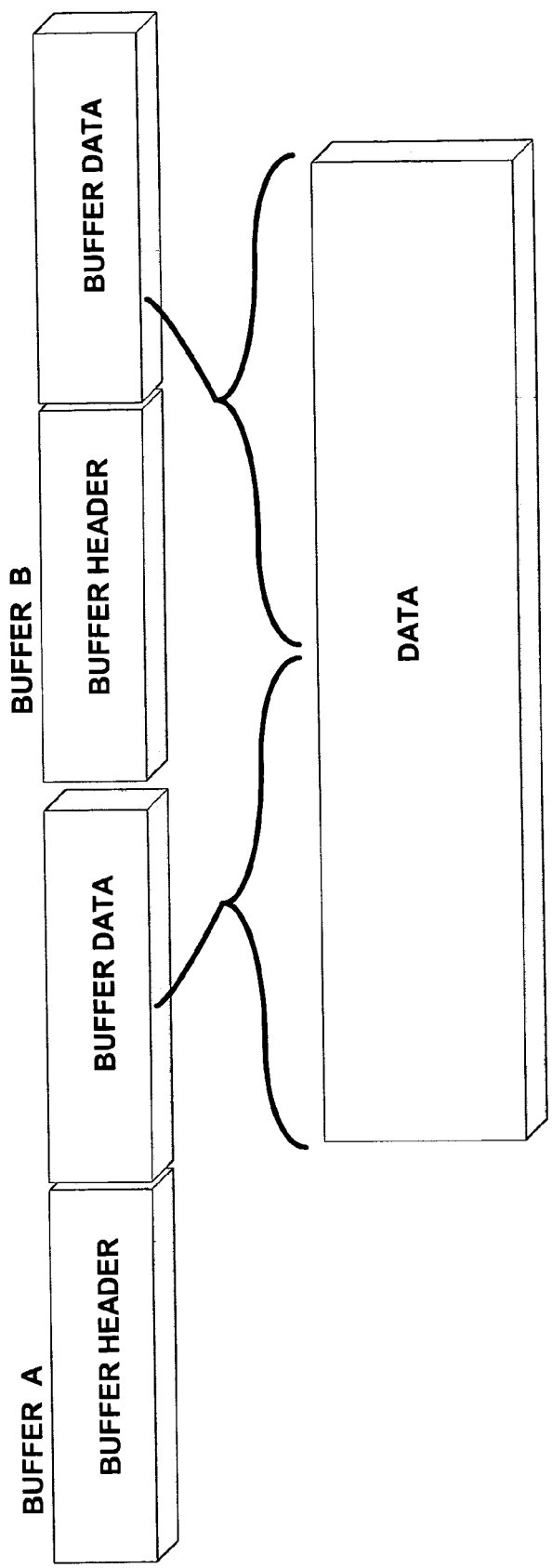
FIG. 6 illustrates an exemplary token less data stream in accordance with an aspect of the present invention.

Tokenless Stream
    As explained earlier some messages do not use tokens to describe the data portion of the data stream. In such cases all the information required to describe the buffer data is contained in the buffer header. This is referred to as a tokenless stream, and is essentially just a collection of buffers and data. FIG. 6 illustrates a tokenless stream in accordance with an aspect of the present invention that spans two buffers A and B.

Figure 7:
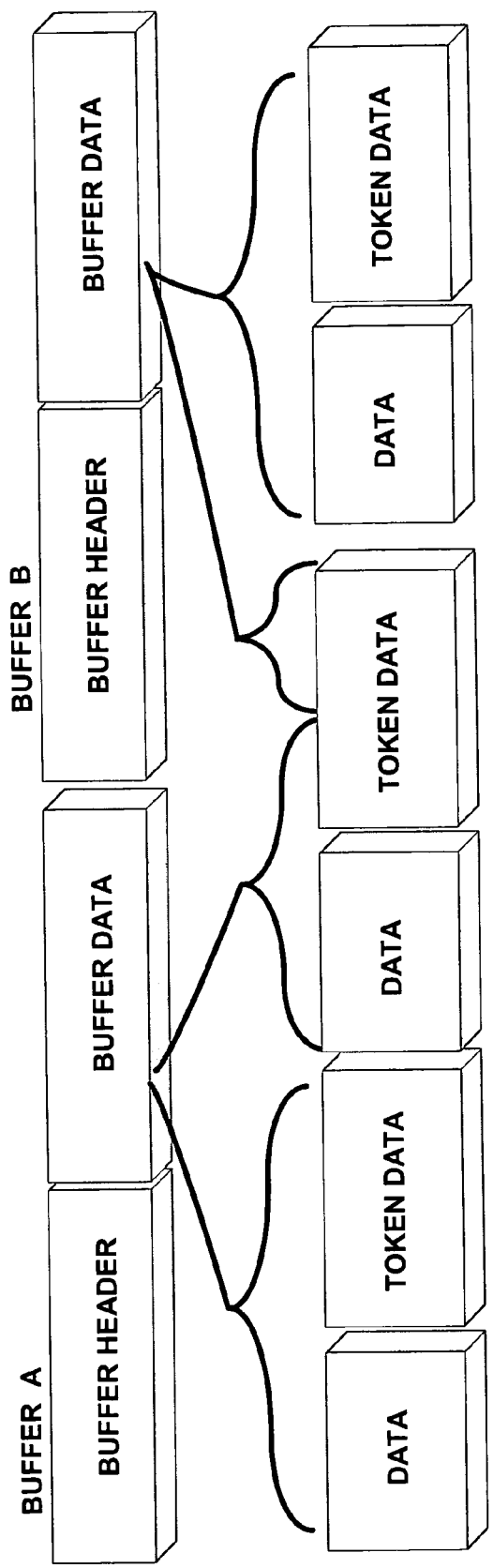
FIG. 7 illustrates an exemplary token data stream in accordance with an aspect of the present invention.

Token Stream
    More complex messages (e.g. Row Data) can be constructed using tokens. FIG. 7 illustrates a token stream according to one aspect of the enhanced TDS protocol of the present invention that spans two buffers, and consists of a single byte identifier, followed by token specific data.
    Typically, there exist four classes of token, a zero length token, a fixed length token, a variable length token and a variable count token. Such are listed below including the bit pattern of the token, various extensions to this bit pattern for a given token class, and a description of their function(s), according to one aspect of the present invention.

Zero Length Token (xx01xxxx)
    This token is not followed by a length. There is no data associated with the token. A zero length token always has its third bit off and the fourth bit on.

Fixed Length Token (xx11xxxx)
    This token can be followed by 1, 2, 4 or 8 bytes of data. No length follows this token since the length of its associated data is encoded in the token itself. Bits 3 and 4 are always on. Bits 5 and 6 indicate the length of the fixed length data, as shown below.
        xx1100xx indicates 1 byte of data.
        xx1101xx indicates 2 bytes of data.
        xx1110xx indicates 4 bytes of data.
        xx1111xx indicates 8 bytes of data.
    In one exemplary aspect of the present invention, fixed length tokens can be employed by the following data types: bigint, int, smallint, tinyint, float, real, money, smallmoney, datetime, smalldatetime, and bit.

Variable Length Tokens (xx10xxxx)
    This token is followed by a length. The length (in bytes) of this length is included in the token itself as a "Length"

value (see the "Length" rule of the COLINFO token stream), as described toward an end section of this specification. Bit 3 is always on and bit 4 is always off.

001001xx, 001010xx, 001011xx, 011001xx, 011010xx or 011011xx indicate 1 byte of length
1010xxxx or 1110xxxx indicate 2 bytes of length.
001000xx or 011000xx indicate 4 bytes of length.

There can be two data types that can be of a variable length. Such are "real" variable length data types like char and binary and "nullable" data types that are either their normal fixed length or a special length if null. Char and binary data types have values which are either null, or 0 to 65534 bytes in length. Null is represented by a length of 65535. A char or binary which cannot be null can still have a length of zero (e.g. an empty value). A program which must pad a value to a fixed length can typically add blanks to the end of a char and binary zeros to the end of a binary. Text and image data types have values which are either null, or 0 to 2 gb bytes in length. Null is represented by a length of −1. Other nullable data types have a length of 0 if they are null.

Variable Count Tokens (xx00xxxx)

This token is followed by a count of the number of following fields. Each field length is dependent on the token type. The total length of the token can be determined by walking the fields. A variable count token always has its third and fourth bits off.

1010xxxx or 1110xxxx indicate 2 bytes of count.

DONE and ATTENTION Tokens

The server generates a DONE token for every TRANSACT-SQL statement. In the implementation of ODBC all DONES can be passed back to the user when executing ad-hoc SQL statements. When handling results from stored procedures, ODBC can pass back to the user DONES which are part of SQL select statements. Such can be primarily due to triggers, but also can be due to the way stored procedures are used. It is very common for an application user to submit a simple update to the server and cause more than one SQL statement to be executed due to trigger on the target table. If all the DONES were passed back to the user, such user would have to be aware of any trigger and/or stored procedure that might get executed, including all the statements contained in the triggers and stored procedures Token Stream Examples The following two examples highlight token stream communication, in accordance with an aspect of the present invention.

Sending a SQL Batch

In this example a SQL statement is sent to the server and the results are sent to the client. The SQL statement is:

select name, empid from employees
update employees set salary=salary*1.1
select name from employees where department

| Client: | SQL statement | | |
|---|---|---|---|
| Server: | COLMETADATA | data stream | |
| | ROW | data stream | |
| | . | | |
| | . | | |
| | . | | |
| | ROW | data stream | |
| | DONE | data stream | (with DONE_COUNT & DONE_MORE bits set) |
| | DONE | data stream | (for UPDATE, with DONE_COUNT & DONE_MORE bits set) |
| | COLMETADATA | data stream | |
| | ROW | data stream | |
| | . | | |
| | . | | |
| | . | | |
| | ROW | data stream | |
| | DONE | data stream | (with DONE_COUNT bit set) |

Out-of-Band Attention Signal

In this example a SQL command is sent to the server, yet before all the data has been returned an interrupt or "Attention Signal" is sent to the server. The client reads and discards any data received between the time the interrupt was sent and the interrupt acknowledgment was received. The interrupt acknowledgment from the server is a bit set in the status field of the DONE token.

| Client: | select name, empid from employees | |
|---|---|---|
| Server: | COLMETADATA | data stream |
| | ROW | data stream |
| | . | |
| | . | |
| | . | |
| | ROW | data stream |
| Client: | ATTENTION SENT | |
| | [ | |
| Server: | DONE | data stream (with DONE_ATTN bit set) |

According to another aspect of the present invention, a versioning scheme is provided that enables a handshake between client (e.g. 420 in FIG. 4) and server (e.g. 450 in FIG. 4) such that both down level, as well as newer clients can communicate with down level and newer servers. Such a scheme accounts for chronological versioning of components (e.g. release dates) as well as software versioning (e.g. protocol version), and negotiates down to the common version between the client and the server side, for an instant determination of the version of the TDS protocol. To initiate communication, the client driver sends a login record to the server, which can for example contain a 4-byte TDS version, indicative of the most recent protocol that the client understands. Based in part on this login record the server makes an inference of the versions that the client understands, and which at the same time is also understandable by the server. For example, the 4 byte TDS version can be split into three distinct parts, form hi-byte to lo-byte, with each distinct part indicative of a defined structure for the syntax and semantics of the TDS protocol. In this example, the first part is a major number or major version (such as in the form 0xNN, N being an integer; e.g. 0x70, 0x71, 0x72) indicative of a particular version of the SQL. The second part can be an increment number indicative of the TDS change (such as in the form of 0xNN, N being an integer), and the third part can be a minor number or minor version (such as 0xNNNN, N being an integer), which can indicate a number associated with the Response Time Monitor (RTM) server. Accordingly a server that employs the version 0x72020002 has a major number of 0x72, an increment number of 0x02, and a minor number of 0x0002.

Typically, by looking at the client's major number, a server can infer that if the server's major number is less than or equal that of the client's major number, a successful hand shake can be instigated. For example a client having a major version 0x71 and a minor version of 0x0004 attempts to initiate handshake with a server having a major version 0x71 and a minor version of 0x0002. Such server can find its largest major number that is less than or equal the major number sent by the client, for which there is also a minor below or equal the minor received. In this example, both the client and the server understand a TDS protocol having a major 0x71 and a minor version 0x0002.

Figure 8:
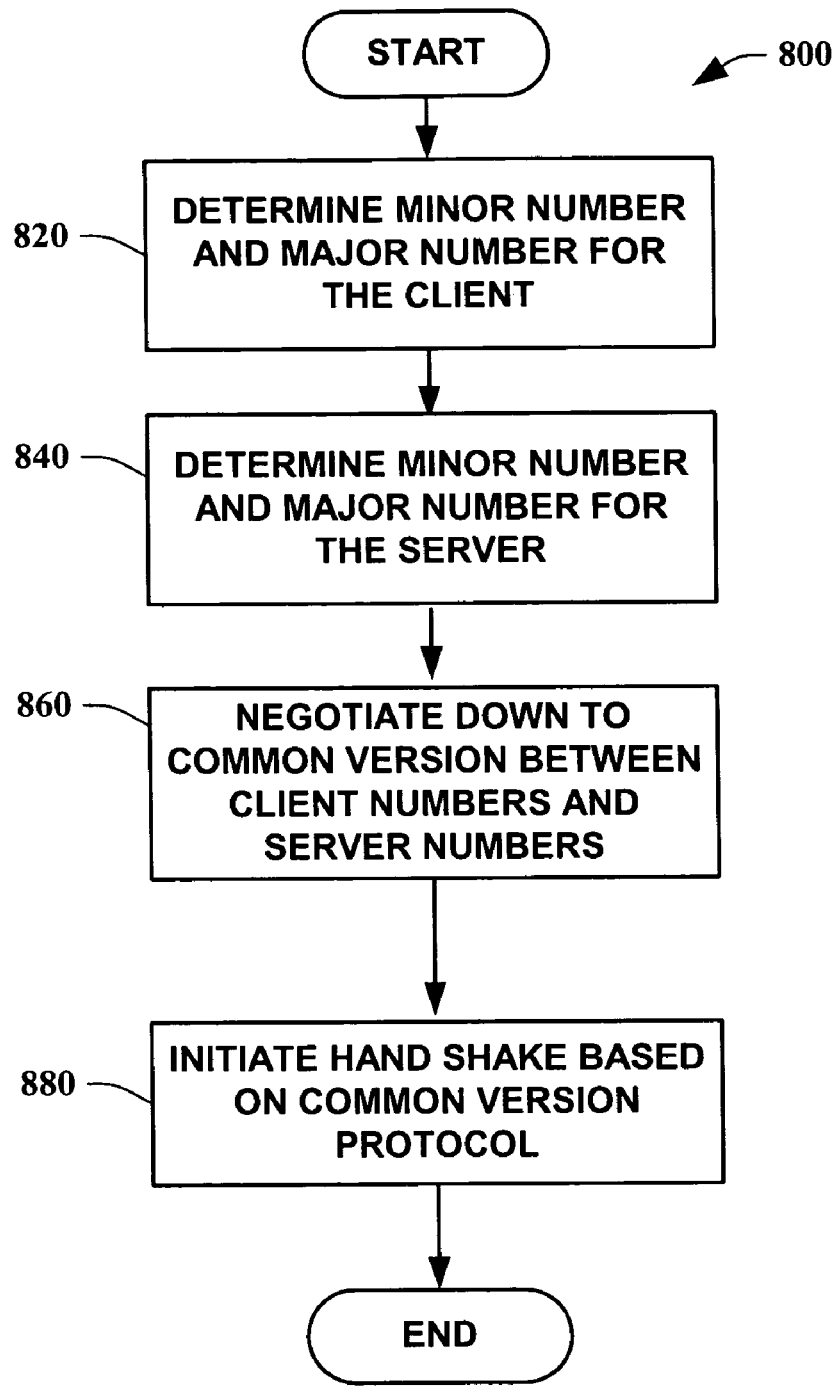
FIG. 8 illustrates a versioning scheme in accordance to one aspect of the present invention.

FIG. 8 illustrates a methodology according to one aspect of the versioning scheme 800 of the present invention. Initially and at 820, the minor and major number for the client, which has attempted a handshake with the server, is determined. At 840 a similar determination is made for the major and minor number of the server. The methodology then proceeds to step 860, wherein based in part on the major and minor numbers of the client and the server, a common version is negotiated down to. Such common version is understandable both by the client and the server. Accordingly and at 880, a successful hand shake can be instigated between the client and the server. While the exemplary method is illustrated and described herein as a series of blocks representative of various events and/or acts, the present invention is not limited by the illustrated ordering of such blocks. For instance, some acts or events may occur in different orders and/or concurrently with other acts or events, apart from the ordering illustrated herein, in accordance with the invention. In addition, not all illustrated blocks, events or acts, may be required to implement a methodology in accordance with the present invention. Moreover, it will be appreciated that the exemplary method and other methods according to the invention may be implemented in association with the method illustrated and described herein, as well as in association with other systems and apparatus not illustrated or described.

For all products, and for any given major and minor combination, one recognized increment number can be assigned. Such increment number can be a number from 0x00 to 0xFF, (wherein F represent a 4-bit hexadecimal value), with no relation to the increment of another major-minor combination. During development, the increment can be employed in order to stagger out TDS changes. The server typically recognizes more than one increment for the major-minor combinations in development, and is thus free to make the next round of TDS changes. Such changes however can be enabled under the next increment, as the client will not face these changes until it has bumped up its increment.

Thus, a joint check in is typically not required, and connectivity breakage can be avoided. Once the client also bumps its increment and checks in, the server can wait for a period and thereafter assumes that all users have obtained an updated version, and then drop support for the old increment. Such process can for example support 255 rounds of TDS changes during any release. It is noted that the dropping of support is merely for the old increment, and thus support for old shipped versions are not dropped. For example, support can be dropped for old increments of a particular TDS SQL server, while it is in development. As such, a client never needs to support multiple increments, as server changes can occur in advance of any client change. Thus, back ground compatibility between the server and client can be improved when changes occur to versions of the TDS protocol being implemented in client and servers.

In another aspect of the enhanced TDS protocol of the present invention various new headers are provided including a new header as part of; batch of SQL commands, Transaction Manager Request and Remote Procedure Calls. Such new headers can be typically required for all incoming client requests and specifies two pieces of information, namely; a Transaction Descriptor, and an outstanding request count.

Transaction Descriptor

As part of the Unified Transaction Framework infrastructure, SQL Server according to the present invention can be enhanced to support more than one active transaction under a single session. Accordingly, client drivers can create more than one transaction, and freely associate requests sent to the server to any of the active transactions. Transactions can be described by "transaction descriptors". Such descriptor is the one sent on this part of the protocol header, to indicate which transaction a given request should run under.

Outstanding Request Count

One aspect of the enhanced TDS protocol of the present invention can improve consistency of behavior on the server side, e.g. when the server commits transactions. Initially and as part of a header field, the client sends the number of pending requests known to the client driver. In case the server already is done with processing of previous requests, such number reported by the client helps synchronize and coordinate view of number of pending requests between the client and the server. Such can typically mitigate inconsistent server behavior, such as from instances wherein buffer zones are waiting to be read by the client. For example, a typical inconsistent behavior can arise when the client executes a query, the server performs and the results sit in a network buffer, waiting to be read by the client. If the results are such that they can fit entirely within the network buffers, the server is considered finished and ready to accept new requests from the client. Nonetheless, if the results do not entirely fit within the network buffers, the server can still be considered tied up with previous transaction, and not able to accept new requests. Thus, depending upon a size of the buffer zone, requests can fail or succeed, leading to an unpredictable server behavior. The Multiple Active Result Sets (MARS) header of the enhanced protocol improves an ability to keep semantics constant regardless to the size of the results produced by a query.

In a related aspect according to the present invention, query notification header is provided as part of the enhanced TDS protocol. At the time of establishing the query, the server is asked to provide the client with future updates related to the query. As such the requirement for periodically re-asking the server of any changes to the initial query is mitigated. Accordingly, the manner of sending such notifications (e.g. channels for sending the notification), as well as the set up for notification is established at the time of the query, and does not require changes to be made on the client side. Moreover, such feature allows creation of middle tier type caches that are transparent to the client.

The following illustrates an exemplary description of various data streams, as well as exemplary headers employed in conjunction with a message exchange between client and server, according to one particular aspect of the present invention:

Stream Types

Unknown Length Streams

Unknown length streams are used by some token-less data streams. It is a stream of bytes. The number of bytes within the data stream is defined in the buffer header.

```
BYTESTREAM       := {BYTE};
UNICODESTREAM    :={BYTE, BYTE};
```

Variable Length Data Streams

Variable length data streams consist of a stream of characters or a stream of bytes. Streams of bytes are defined as one of two possible types, "Generic Bytes" and "Complex Bytes". The two types are similar, in that they both have a length rule and a data rule, yet in the complex byte variable length data stream definition, the length can be broken out into a separate rule at the "message specific" rule level, for extra flexibility.

Characters

Variable length streams of characters can be defined by a length field followed by data itself. There are three types of variable length character streams, each dependent on the size of the length field (e.g. a BYTE, USHORT or LONG). If the value of the length field is zero, then no data follows the length field:

```
B_VARCHAR  := BYTELEN, {BYTE};
US_VARCHAR := USHORTLEN, {BYTE};
L_VARCHAR  := LONGLEN, {BYTE};
```

Generic Bytes

Similar to the variable length character stream, variable length byte streams are defined by a length field followed by the data itself:

```
B_VARBYTE   := BYTELEN, {BYTE};
US_VARBYTE  := USHORTLEN, {BYTE};
L_VARBYTE   := LONGLEN, {BYTE};
```

Complex Bytes

Messages that use variable length byte streams can use a well known format of the variable length byte stream itself (e.g. BulkLoadData). In such cases variable length byte streams can be explicitly defined in a similar format to that shown above, rather than use the generic B_VARBYTE, US_VARBYTE or L_VARBYTE format:

```
DetailsLength  := USHORT;
Name           := {BYTE}-;
Address        := {BYTE}-;
AccountNumber  := BYTE;
Details        := Name,
                  Address,
                  DetailsLength,
                  AccountNumber;
Account        := DetailsLength, {Details};
```

It is noted that the 'ACCOUNT' rule has a 'length' (e.g. DetailsLength).

Datatype Dependant Data Streams

Some messages contain variable data types. The actual type of a given variable datatype can depend on type of data being sent within the message.

For example, the RPCRequest message contains the TYPE_INFO and TYPE_VARBYTE rules.

These two rules contain data of a type that can depend on actual type employed in value of the FIXEDLENTYPE or VARLENTYPE rules of the TYPE_INFO rule.

Datatype dependent data streams can occur in two forms, integers and bytes:

Integers

Datatype dependant integers can be either a BYTELEN, USHORTCHARBINLEN, or LONGLEN in length. This length can depend on the TYPE_INFO associated with the message. If the datatype (i.e. FIXEDLENTYPE or VARLENTYPE rule of the TYPE_INFO rule) is of type TEXTTYPE, NTEXTTYPE, IMAGETYPE or SSVARIANTTYPE the integer length is LONGLEN. If the datatype is BIGCHARTYPE, BIGVARCHARTYPE, NCHARTYPE, NVARCHARTYPE, BIGBINARYTYPE or BIGVARBINARYTYPE the integer length is USHORTLEN. For all other datatypes the integer length is BYTELEN.

```
TYPE_VARLEN := BYTELEN
             |
               USHORTCHARBINLEN;
             |
               LONGLEN
```

Fixed and Variable Bytes

The datatype to be used in a datatype dependant byte streams is defined by the TYPE_INFO rule associated with the message.

For variable length types, the TYPE_VARLEN value defines the length of the data that follows.

As described above, the TYPE_INFO rule defines the type of TYPE_VARINT (i.e. BYTELEN, USHORTLEN or LONGLEN).

For fixed length types, the TYPE_VARINT rule is not present. In these cases the number of bytes to be read can be determined by the TYPE_INFO rule (e.g. if "INT2TYPE" can be specified as the value for the FIXEDLENTYPE rule of the TYPE_INFO rule, 2 bytes should be read, as "INT2TYPE" is always 2 bytes in length.

The data following this, can be a stream of bytes, or a NULL value. The CHARBIN_NULL rule is used for BIGCHARTYPE, BIGVARCHARTYPE, NCHARTYPE, NVARCHARTYPE, BIGBINARYTYPE and BIGVARBINARYTYPE types and the GEN_NULL rule for all other types:

```
TYPE_VARBYTE := [TYPE_VARLEN], {BYTE}
             |
               CHARBIN_NULL
             |
               GEN_NULL;
```

Partially Length-Prefixed Bytes

Unlike fixed or variable byte stream formats, "Partially length-prefixed bytes" does not require the full data length to be specified before the actual data is streamed out. Thus, it is ideal for those applications where the data length may not be known upfront (e.g. xml serialization). The rule below describes such stream format:

```
PLP_BYTES    := TYPE_INFO, PLP_BODY
PLP_BODY     := PLP_NULL
              |
                {ULONGLONGLEN | UNKNOWN_PLP_LEN },
                    {PLP_CHUNK}, PLP_TERMINATOR
PLP_NULL     := '0 × FFFFFFFFFFFFFFFF'
UNKNOWN_     := '0 × FFFFFFFFFFFFFFFE'
PLP_LEN
```

-continued

```
PLP_CHUNK    := ULONGLEN, {BYTE}-
PLP_TER-     := '0 x 00000000'
MINATOR
```

It is noted that:
TYPE_INFO rule specifies a "Partially Length-prefixed Datatype" (In the UNKNOWN_PLP_LEN case, the data is represented as a series of zero or more 'chunks', each consisting of the 'length' field followed by 'length' bytes of data (see the PLP_CHUNK rule). The data is terminated by PLP_TERMINATOR (which is essentially a zero-length 'chunk').
In the 'actual data length' case, the ULONGLONGLEN is followed by the specified number of bytes of data (this is similar to the "Variable Bytes" format).

Stream Headers—ALL_Headers Rule Definition

Some message streams can be preceded by a variable number of headers as specified by the ALL_HEADERS rule. List of headers that are applicable to the different types of messages are described in the following table.

It is noted that stream headers can be present in first packet in requests that spans more than one packet.

| Header | Value | SQLBatch | RPCRequest | TransactionManagerRequest |
|---|---|---|---|---|
| Query Notifications | 0x00 01 | Optional | Optional | Disallowed |
| MARS | 0x00 02 | Required | Required | Required |

Stream Specific Rules

```
TotalLength        :=DWORD; //including itself
HeaderLength       :=DWORD; //including itself
HeaderType         :=USHORT;
HeaderData         :={BYTE};
Header             :=HeaderLength, HeaderType, HeaderData;
Stream Definition ALL_HEADERS        :=TotalLength, {Header};
```

TABLE 5

| Parameter | Description |
|---|---|
| TotalLength | Total length of all header stream. |
| HeaderLength | Total length of the individual header. |
| HeaderType | The particular type of header as described in the table above. |
| HeaderData | The data stream for the header. See each specific header description below. |
| Header | A structure for a single header |

Query Notifications Header

Contains information specifying that a notification is desired on the request, and information for delivery of the notification.

Stream Specific Rules

```
NotifyId           := USHORT, UNICODESTREAM;
SSBDeployment      := USHORT, UNICODESTREAM;
```

-continued

```
NotifyTimeout              := ULONG;
The USHORT specify the length in bytes of the UNICODESTREAMs.
Stream Definition Header Data                := NotifyId,
                              SSBDeployment,
                              [NotifyTimeout];
```

MARS Header

As explained earlier, such aspect of TDS protocol of the present invention contains information regarding transaction descriptor and number of outstanding requests in support of MARS.

Under AutoCommit mode, TransactionDescriptor must be 0 and OutstandingRequestCount must be 1.

Stream Specific Rules

```
OutstandingRequestCount    :=DWORD;
TransactionDescriptor      :=ULONGLONG;
```

Stream Definition

```
Header Data                :=TransactionDescriptor,
                              OutstandingRequestCount;
```

As described above, a query notification header is also provided as part of the enhanced TDS protocol. At the time of establishing the query, the server is asked to provide that the client with future updates related to the query. As such the requirement for periodically re-asking the server of any changes to the initial query is mitigated. Accordingly, the manner of sending such notifications (e.g. channels for sending the notification), as well as set up for notification can be established at time of the query, and does not require changes to be made on the client side. Moreover such feature allows creation of middle tier type caches that are transparent to the client. At the same time, developers building the caching layers need not be the same as the developers who create the Structured Query Language (SQL) application. Thus, the query notification feature can enable an infrastructure component that can provide for development of caching layers on top of SQL server applications. Any request sent to the server can be pre-pended by a QN header, indicating that subscriptions should be established for each statement executed. The payload of the header can contain:

Notification Message: A correlation string provided by the user and flowed back at firing time, Service Broker Service: name of the service to be used for delivery, and Timeout: Minimum time to live of the subscription.

Figure 9:
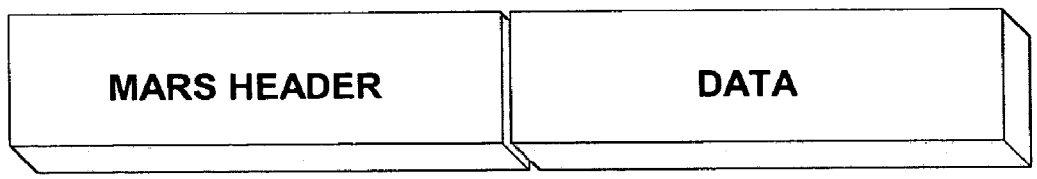
FIG. 9 illustrates exemplary data and header arrangements according to a particular aspect of the present invention.
Figure 9:

FIG. 9 illustrates exemplary data and header arrangements according to particular aspects of the present invention, wherein a MARS headers and a Query notification header is employed as part of the data stream.

In a related aspect of the present invention, a TDS protocol is enhanced to include the notion of "resetting a connection" which cleans up server side state of the connection and allows client drivers to cache and reuse the connection. Accordingly, such request to rest connection can be performed as part of the function for the next request that is sent under a connection.

As such, and in conjunction with MARS feature, a request can itself send a request that includes re-set connection to the server, and shortly thereafter send another request under the same connection. Such aspect of the present invention can also include the environment change notification (ENVCHAGE), which can be sent back to the client driver, as soon as the reset operation completes, without the need to wait for the request to execute. Such can reduce latency in the driver to determine success of a reset operation and enables other MARS requests to be submitted as soon as confirmation of reset success has been received. Moreover, such feature enables by passing the client and perform particular activities, and then notify the client—as opposed to initially waiting for the client driver to provide instructions.

Figure 10:
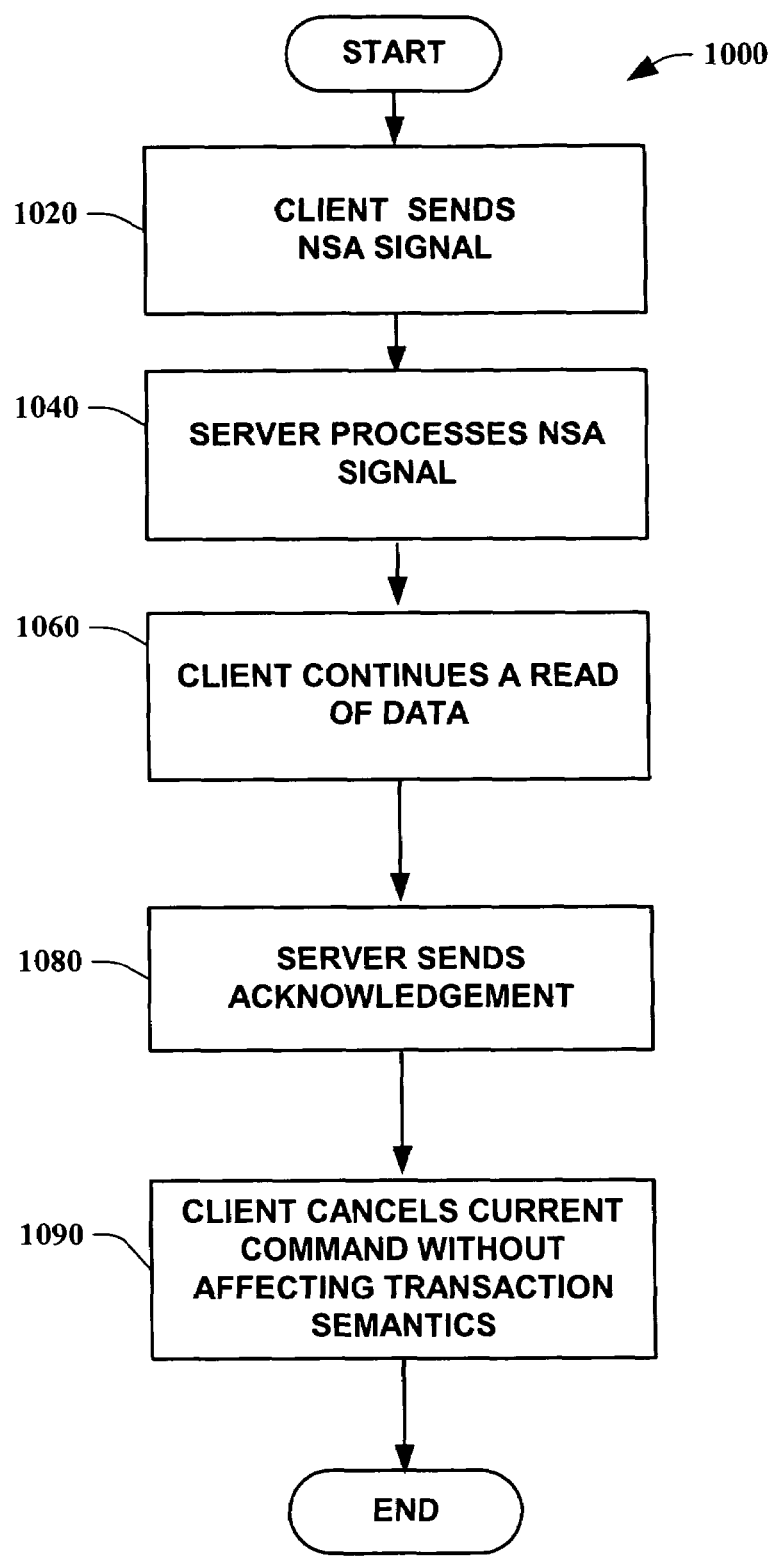
FIG. 10 illustrates a methodology for canceling a command according to one aspect of the present invention.

Referring now to FIG. 10, another aspect of the present invention is illustrated as method 1000, wherein client can interrupt and cancel a current command without affecting transaction semantics. Such is performed by the client sending a non severe attention (NSA) signal at 1020. Once the client sends an NSA, the client continues to read at 1060 until it gets an attention acknowledgment sent by the server at 1080. As such, an NSA can cancel a specific request though it does not affect the state of the current transaction at 1090. It is noted that an NSA can typically be sent to the server during the execution of the stored procedures for; Sp_cursor, Sp_cursorfetchnext, Sp_cursoroption, and if invoked via IPC (numbered on RPC requests.)

The following illustrates an exemplary description of the various data streams, as well as and above identified headers in conjunction with a particular message exchange between the client and the server. It is noted that references to the terms "Shiloh", "Yukon", "Sphinx", "MSSQL" are exemplary SQL servers with TDS protocol.

Datatype Definitions

Fixed Length Datatypes
Note that these Fixed Length Datatypes are all of 1 byte in length, as specified in section 5.3.3.

| NULLTYPE | := | '0 × 1f' |
| INT1TYPE | := | '0 × 30' |
| BITTYPE | := | '0 × 32' |
| INT2TYPE | := | '0 × 34' |
| INT4TYPE | := | '0 × 38' |
| DATETIM4TYPE | := | '0 × 3a' |
| FLT4TYPE | := | '0 × 3b' |
| MONEYTYPE | := | '0 × 3c' |

-continued

Fixed Length Datatypes
Note that these Fixed Length Datatypes are all of 1 byte in length, as specified in section 5.3.3.

| DATETIMETYPE | := | '0 × 3d' |
| FLT8TYPE | := | '0 × 3e' |
| MONEY4TYPE | := | '0 × 7a' |
| INT8TYPE | := | '0 × 7f' |
| FIXEDLENTYPE | := | NULLTYPE |
| | | \| |
| | | INT1TYPE |
| | | \| |
| | | BITTYPE |
| | | \| |
| | | INT2TYPE |
| | | \| |
| | | INT4TYPE |
| | | \| |
| | | INT4DATETIM4TYPE |
| | | \| |
| | | FLT4TYPE |
| | | \| |
| | | MONEYTYPE |
| | | \| |
| | | DATETIMETYPE |
| | | \| |
| | | FLT8TYPE |
| | | \| |
| | | MONEY4TYPE |
| | | \| |
| | | INT8TYPE |

Variable Length Datatypes

| GUIDTYPE | := | '0 × 24' |
| INTNTYPE | := | '0 × 26' |
| DECIMALTYPE | := | '0 × 37' |
| NUMERICTYPE | := | '0 × 3f' |
| BITNTYPE | := | '0 × 68' |
| DECIMALN | := | '0 × 6a' |
| NUMERICNTYPE | := | '0 × 6c' |
| FLTNTYPE | := | '0 × 6d' |
| MONEYNTYPE | := | '0 × 6e' |
| DATETIMNTYPE | := | '0 × 6f' |
| CHARTYPE | := | '0 × 2f' |
| VARCHARTYPE | := | '0 × 27' |
| BINARYTYPE | := | '0 × 2d' |
| VARBINARYTYPE | := | '0 × 25' |
| BIGVARBINTYPE | := | '0 × A5' |
| BIGVARCHRTYPE | := | '0 × A7' |
| BIGBINARYTYPE | := | '0 × AD' |
| BIGCHARTYPE | := | '0 × AF' |
| NVARCHARTYPE | := | '0 × e7' |
| NCHARTYPE | := | '0 × ef' |
| XMLTYPE | := | '0 × f1' |
| UDTTYPE | := | '0 × F0' |
| TEXTTYPE | := | '0 × 23' |
| IMAGETYPE | := | '0 × 22' |
| NTEXTTYPE | := | '0 × 63' |
| SSVARIANTTYPE | := | '0 × 62' |
| BYTELEN_TYPE | := | GUIDTYPE |
| | | \| |
| | | INTNTYPE |
| | | \| |
| | | DECIMALTYPE |
| | | \| |
| | | NUMERICTYPE |
| | | \| |
| | | BITNTYPE |
| | | \| |
| | | DECIMALN |
| | | \| |
| | | NUMERICNTYPE |
| | | \| |
| | | FLTNTYPE |
| | | \| |
| | | MONEYNTYPE |
| | | \| |
| | | DATETIMNTYPE |
| | | \| |
| | | CHAPTYPE |

-continued

```
Fixed Length Datatypes
Note that these Fixed Length Datatypes are all of 1
byte in length, as specified in section 5.3.3.

|
                              VARCHARTYPE
                              |
                              BINARYTYPE
                              |
                              VARBINARYTYPE
                              |
      USHORTLEN_TYPE:= BIGVARBINTYPE
                              |
                              BIGVARCHRTYPE
                              |
                              BIGBINARYTYPE
                              |
                              BIGCHARTYPE
                              |
                              NVARCHARTYPE
                              |
                              NCHARTYPE
                              |
                              UDTTYPE
      LONGLEN_TYPE:= SSVARIANTTYPE
      VARLENTYPE:= BYTELEN_TYPE
                              |
                              USHORTLEN_TYPE
                              |
                              LONGLEN_TYPE
```

Nullable values are returned using the INTNTYPE, BITNTYPE, FLTNTYPE, MONEYNTYPE, DATETIMNTYPE tokens which will use the length byte to specify the length of the value or GEN_NULL as appropriate.

Partially Length-prefixed Datatypes

```
              PARTLENTYPE := XMLTYPE
                              |
                              BIGVARCHRTYPE
                              |
                              BIGVARBINTYPE
                              |
                              NVARCHARTYPE
                              |
                              TEXTTYPE
                              |
                              IMAGETYPE
                              |
                              NTEXTTYPE
```

BIGVARCHRTYPE, BIGVARBINTYPE and NVARCHARTYPE can represent two types each: one is the regular type with a known maximum size range from 0 to 8000, and the other has unlimited max size, known as varchar(max), varbinary(max) and nvarchar(max), which has a max size of 0xffff User Defined Datatypes

```
UDT_METADATA_TYPE  :=BYTE, US_VARBYTE;
DBID  :=ULONG;
TYPEID  :=US_VARCHAR;
UDT_INFO :=         DBID,
                    UDT_METADATA_TYPE,
                    TYPEID;
```

UDT METADATA byte specifies type of metadata to be used, defined by UDT implementation, and defines semantics of byte stream that follows.

DBNAME specifies the name of the database where the type was defined.

TYPENAME specifies the 1-part or 2-part name of the UDT.

UDTs in RPC

The definition for UDTs as RPC parameters is the following:

```
DB_NAME                                :=B_VARCHAR;
OWNING_SCHEMA                          :=B_VARCHAR;
TYPE_NAME                              :=B_VARCHAR;
UDT_METADATA                           :=US_VARBYTE;
UDT_INFO          :=DB_NAME,
                     OWNING_SCHEMA,
                     TYPE_NAME,
                     UDT_METADATA;
```

Note that the length for the parameters of type UDT, BLOB, or XML is specified as a ULONGLONG as with PLP values.

System Defined UDTs

System defined UDTs are system types implemented using the CLR UDT infrastructure. In general they are sent on TDS as user CLR UDTs would be, with the following exceptions:

User Type rule in the TYPE_INFO rule sent as part of the COLMETADATA stream specifies the ID of the type. System UDTs have IDs between 128 and 255. In particular:

| UtcDateTime specifies: | 0x80 |
| Date specifies: | 0x81 |
| Time specifies: | 0x82 |

Note that regardless, the type is declared as being UDTTYPE.

DBID is specified as 0x0000 within the UDT_INFO rule.

XML Data Type

```
#TDS_VERSION# (0x7202xxx)
OWNING_SCHEMA.
#END_TDS_VERSION#
SCHEMA_PRESENT                         :=BYTE;
DBNAME                                 :=B_VARCHAR;
```

```
OWNING_SCHEMA                              :=US_VARCHAR;
XML_SCHEMA_COLLECTION                      :=B_VARCHAR;
XML_INFO :=SCHEMA_PRESENT,
        [DBNAME, OWNING_SCHEMA, XML_SCHEMA_COLLECTION
SCHEMA_PRESENT specifies '0x01' if the type has an associated schema collection and
DBNAME, OWNING_SCHEMA and XML_SCHEMA_coLLECTiON are included in the stream, or
'0x00' otherwise.
DBNAME specifies the name of the database where the schema collection is defined.
OWNING_SCHEMA specifies the name of the relational schema containing the schema
collection.
XML_SCHEMA_COLLECTION specifies the name of the xml schema collection to which the type
is bound.
SQL_VARIANT
    Sql_Variant values have internal structure according to the following definition:
VARIANT_BASETYPE                   :=BYTE;
VARIANT_PROPBYTES                  :=BYTE;
VARIANT_PROPERTIES                 :={BYTE};
VARIANT_DATAVAL                    :={BYTE};
SSVARIANT_INSTANCE                 :=VARIANT_BASETYPE;
                                     VARIANT_PROPBYTES;
                                     VARIANT_PROPERTIES;
                                     VARIANT_DATAVAL;
VARIANT_BASETYPE is the TDS token of the base type.
```

| Base Type | VARIANT_PROPBYTES | VARIANT_PROPERTIES |
|---|---|---|
| types tinyint, smallint, int, bigint, float, real, uniqueidentifier, datetime, smalldatetime, money, smallmoney, bit | 0 | <not specified> |
| Binary, varbinary | 2 | 2 bytes specifying max length |
| numeric, decimal | 2 | 1 byte for precision, 1 byte for scale |
| varchar, char, nvarchar, nchar | 7 | 5-byte TDSCOLLATION, followed by a 2 byte max length |

Type Info Rule Definition

The 'TYPE_INFO' rule applies to several messages used to describe column information. For columns of fixed data length, the type is all that is required to determine the data length. For columns of a variable length type, TYPE_VARLEN defines the length of the data contained within the column.

```
'PRECISION' and 'SCALE' only occur if the type is 'NUMERIC',
'NUMERICN', 'DECIMAL' or 'DECIMALN'.
'COLLATION' only occurs if the type is 'BIGCHARTYPE',
'BIGVARCHRTYPE', 'TEXTTYPE',
'NTEXTTYPE', 'NCHARTYPE' or 'NVARCHARTYPE'.
'UDT_INFO' always occurs if the type is 'UDTTYPE'.
'XML_INFO' always occurs if the type is 'XMLTYPE'.
'USHORTMAXLEN' does not occur if PARTLENTYPE is XMLTYPE.
USHORTMAXLEN       := '0 x FFFF'
TYPE_INFO          := FIXEDLENTYPE
                      |
                      (VARLENTYPE, TYPEVARLEN)
                      [COLLATION]
                      [UDT_INFO]
                      ([PRECISION], [SCALE])
                      |
                      PARTLENTYPE
                      [USHORTMAXLEN]
                      [COLLATION] [XML_INFO]
Tokens
ALTMETADATA_TOKEN      :=   '0 x 88'
ALTROW_TOKEN           :=   '0 x D3'
COLMETADATA_TOKEN      :=   '0 x 81'
COLINFO_TOKEN          :=   '0 x A5'
DEBUG_CMD_TOKEN        :=   '0 x 60'
```

```
                          -continued

DONE_TOKEN             :=   '0 x FD'
DONEPROC_TOKEN         :=   '0 x FE'
DONEINPROC_TOKEN       :=   '0 x FF'
ENVCHANGE_TOKEN        :=   '0 x E3'
ERROR_TOKEN            :=   '0 x AA'
INFO_TOKEN             :=   '0 x AB'
LOGINACK_TOKEN         :=   '0 x AD'
OFFSET_TOKEN           :=   '0 x 78'
ORDER_TOKEN            :=   '0 x A9'
RETURNSTATUS_TOKEN     :=   '0 x 79'
RETURNVALUE_TOKEN      :=   '0 x AC'
ROW_TOKEN              :=   '0 x D1'
SSPI_TOKEN             :=   '0 x ED'
TABNAME_TOKEN          :=   '0 x A4'
```

Tokenless Stream Definitions

Bulk Load BCP

Stream Name:

BulkLoadBCP

Stream Function

Describes the format of bulk loaded data with BULK INSERT. The format is a COLMETADATA token describing the data being sent, followed by multiple ROW tokens, ending with a DONE token. The stream is equivalent to that produced by the server if it were sending the same row set on output.

Stream Comments
> This message sent to the server contains bulk data to be inserted. Its preceded by a SQL message specifying the particulars of the bulk load (i.e. "INSERT BULK tablename . . . ").

Note: Syntax for INSERT BULK includes column definitions:
e.g. INSERT BULK myDb.dbo.myTable (col1 type1, ..., coln typen)

| | | |
|---|---|---|
| Client: | SQL statement "INSERT BULK... " | |
| Server: | Acknowledgement | |
| Server: | COLMETADATA | data stream |
| | ROW | data stream |
| | . | |
| | . | |
| | . | |
| | ROW | data stream |
| | ... | |
| | DONE | data stream (with DONE_COUNT bit set) |

Stream Specific Rules

| | |
|---|---|
| BulkLoad_METADATA | :=COLMETADATA_TOKEN; |
| BulkLoad_ROW | :=ROW_TOKEN; |
| BulkLoad_DONE | :=DONE_TOKEN; |

Sub Message Definition

| | |
|---|---|
| BulkLoadBCP | :=BulkLoad_METADATA {BulkLoad_ROW} BulkLoad_DONE; |

Bulk Load Update Text/Write Text

Stream Name:

BulkLoadUTWT

Stream Function

Describes the format of bulk loaded data with updatetext or writetext.

Stream Comments
> This token sent to the server contains bulk data to be inserted. Its preceded by a SQL message specifying the particulars of the bulk load (i.e. "WRITETEXT BULK . . . ").
> The server returns a RETURNVALUE token containing the new timestamp for this column.

Stream Specific Rules:

| | |
|---|---|
| BulkData | :=L_VARBYTE; |

Stream Definition:

| | |
|---|---|
| BulkLoadUTWT | :=BulkData; |

TABLE 6

Stream Parameter Details

| Parameter | Description |
|---|---|
| BulkData | Contains the BulkData length and BulkData data (within L_VARBYTE). |

Stream Name

Login7

Stream Function

Describes the login record rules for use with 7.0 and later version MSSQLServers.

Stream Comments
> An older server can reject this message. In this case the client can disconnect, format the correct login message for the server version, and re-connect.
> A Login7 stream has a maximum size of 128 K−1 (byte) bytes.
> The OffsetLength and Data rules define the variable length portions of this data stream.
> The OffsetLength rule lists the offset from the start of the structure, and the length for each parameter. If the parameter is not used the parameter length field will be zero. The data itself (e.g. the Data rule) follows these parameters.
> The first parameter of the OffsetLength rule (ibHostName) indicates the start of the variable length portion of this data stream. As such it can never be zero. This is required for forward compatibility (i.e. later versions of TDS, with additional parameters, can be successfully skipped by down-level servers)

Stream Specific Rules

| | |
|---|---|
| Length | :=DWORD; |
| TDSVersion | :=DWORD; |
| PacketSize | :=DWORD; |
| ClientProgVer | :=DWORD; |
| ClientPID | :=DWORD; |
| ConnectionID | :=DWORD; |
| fByteorder | :=BIT; |
| fChar | :=BIT; |
| fFloat | :=BIT, BIT; |
| fDumpLoad | :=BIT; |
| fUseDB | :=BIT; |
| fDatabase | :=BIT; |
| fSetLang | :=BIT; |
| OptionFlags1 | :=fByteorder, fChar, fFloat, fDumpLoad, fUseDB, fDatabase, fSetLang; |
| fLanguage | :=BIT; |
| fODBC | :=BIT; |
| fTranBoundary | :=BIT; |
| fCacheConnect | :=BIT; |
| fUserType | :=BIT, BIT, BIT; |
| fIntSecurity | :=BIT; |
| OptionFlags2 | :=fLanguage, fODBC, fTranBoundary, fCacheConnect, fUserType, fIntSecurity; |

-continued

```
fSQLType           :=BIT, BIT, BIT, BIT;
TypeFlags          :=fSQLType, FRESERVEDBIT, FRESERVEDBIT, FRESERVEDBIT,
                     FRESERVEDBIT;
fChangePassword    :=BIT;
OptionFlags3       :=FRESERVEDBIT, FRESERVEDBIT, FRESERVEDBIT, FRESERVEDBIT,
                     FRESERVEDBIT, FRESERVEDBIT, FRESERVEDBIT, fChangePassword ;
ClientTimZone      :=LONG;
    ClientLCID     :=  FRESERVEDBIT, FRESERVEDBIT, FRESERVEDBIT, FRESERVEDBIT, FRESERVEDBIT,
    FRESERVEDBIT, FRESERVEDBIT, LCID;
ibHostName         :=USHORT;
cchHostName        :=USHORT;
ibUserName         :=USHORT;
cchUserName        :=USHORT;
ibPassword         :=USHORT;
cchPassword        :=USHORT;
ibAppName          :=USHORT;
cchAppName         :=USHORT;
ibServerName       :=USHORT;
cchServerName      :=USHORT;
ibUnused           :=USHORT;
cbUnused           :=USHORT;
ibCltIntName       :=USHORT;
cchCltIntName      :=USHORT;
ibLanguage         :=USHORT;
cchLanguage        :=USHORT;
ibDatabase         :=USHORT;
cchDatabase        :=USHORT;
ClientID           :=BYTE, BYTE, BYTE, BYTE, BYTE, BYTE;
ibSSPI             :=USHORT;
cbSSPI             :=USHORT;
ibAtchDBFile       :=USHORT;
cchAtchDBFile      :=USHORT;
ibChangePassword   :=USHORT;
cbChangePassword   :=USHORT;
cbSSPILong         :=DWORD;
OffsetLength       :=ibHostName,
                     cchHostName,
                     ibUserName,
                     cchUserName,
                     ibPassword,
                     cchPassword,
                     ibAppName,
                     cchAppName,
                     ibServerName,
                     cchServerName,
                     ibUnused,
                     cchUnused,
                     ibCltIntName,
                     cchCltIntName,
                     ibLanguage,
                     cchLanguage,
                     ibDatabase,
                     cchDatabase,
                     ClientID,
                     ibSSPI,
                     cbSSPI,
                     ibAtchDBFile,
                     cchAtchDBFile,
                     ibChangePassword,
                     cchChangePassword,
                     cbSSPILong;
Data               :={BYTE};
Stream Definition Login7             :=Length,
                     TDSVersion,
                     PacketSize,
                     ClientProgVer,
                     ClientPID,
                     ConnectionID,
                     OptionFlags1,
                     OptionFlags2,
                     TypeFlags,
                     OptionFlags3,
                     ClientTimZone,
                     ClientLCID,
                     OffsetLength,
                     Data;
```

TABLE 7

Stream Parameter Details

| Parameter | Description |
| --- | --- |
| Length | The total length of the Login7 structure |
| TDSVersion | The TDS version being used by the client (e.g. 0x70000000 for a 7.0 server). If the TDS Version value sent by the client is greater than the value the server recognizes, the server uses the highest TDS version it can use. This provides a mechanism for clients to discover the server TDS by sending a standard Login7 message.<br>The following lists the version numbers used by clients up to SQL Server 2000 (Shiloh) SP1.<br>7.0 (Sphinx): 0x70 00 00 00<br>7.1 (Shiloh): 0x71 00 00 00 [note: this is different from the server]<br>7.1 SP1: 0x71 00 00 01<br>Post-Shiloh SP1 a new version number scheme will be followed:<br>See the TDS Version numbers spec (tdsversion.doc) for more information. |
| PacketSize | The desired packet size being requested by the client |
| ClientProgVer | The version of the interface library (e.g. ODBC) being used by the client. |
| ClientPID | The process id of the client application |
| ConnectionID | The connection ID of the primary Server. Used when connecting to an "AlwayUp" backup Server. |
| OptionFlags1 | fByteOrder - the byte order used by client for numeric and datetime data types<br>0 = ORDER_X86<br>1 = ORDER_68000<br>fChar - the character set used on the client<br>0 = CHARSET_ASCII<br>1 = CHARSET_EBDDIC<br>fFloat - the type of floating point representation used by the client<br>0 = FLOAT_IEEE_754<br>1 = FLOAT_VAX<br>2 = ND5000<br>fDumpLoad - set is dump/load or BCP capablities are needed by the client<br>0 = DUMPLOAD_ON<br>1 = DUMPLOAD_OFF<br>fUseDB - set if the client desires warning messages on execustion of the USE statement. Not setting this flag results in the client NOT being informed when the database changes, hence it the client will be unaware of any accompanying collation changes<br>0 = USE_DB_ON<br>1 = USE_DB_OFF<br>fDatabase - set if the change to initial database must succeed if the connection is to succeed<br>0 = INIT_DB_WARN<br>1 = INIT_DB_FATAL<br>fSetLang - set if the client desires warning messages on execution of a SET LANGUAGE statement<br>0 = SET_LANG_OFF<br>1 = SET_LANG_ON |
| OptionFlags2 | fLanguage - set if the change to initial language must succeed if the connect is to succeed<br>0 = INIT_LANG_WARN<br>1 = INIT_LANG_FATAL<br>fODBC - set if the client is the ODBC driver. This causes the server to set ANSI_DEFAULTS to ON, IMPLICIT_TRANSACTIONS to OFF. TEXTSIZE to infintate and ROWCOUNT to infinate<br>0 = ODBC_OFF<br>1 = ODBC_ON<br>fTranBoundary - set if the client desires ENVCHANGE or ENVTRAN notifications<br>0 = TRAN_BOUNDARY_OFF<br>1 = TRAN_BOUNDARY_ON<br>fCacheConnect -<br>0 = CACHE_CONNECTION_OFF<br>1 = CACHE_CONNECTION_ON<br>fUserType - The type of user connecting to the server<br>0 = USER_NORMAL<br>1 = USER_SERVER<br>2 = USER_REMUSER<br>3 = USER_SQLREPL<br>fIntSecurity - the type of security required by the client<br>0 = INTEGRATED_SECURTY_OFF<br>1 = INTEGRATED_SECURITY_ON |

TABLE 7-continued

Stream Parameter Details

| Parameter | Description |
|---|---|
| OptionFlags3 | fChangePassword - specifies whether the login request should change the password to the value specified at offset ibChangePassword.<br>0 = No change request. ibChangePassword must be 0<br>1 = Request to change login's password. |
| TypeFlags | fSQLType - the type of SQL the client sends to the server<br>0 = SQL_DFLT<br>1 = SQL_TSQL<br>2 = SQL_ANSI_V1<br>3 = SQL_ANSI89_L1<br>4 = SQL_ANSI89_L2<br>5 = SQL_ANSI89_IEF<br>6 = SQL_ANSI92_ENTRY<br>7 = SQL_ANSI92_TRANS<br>8 = SQL_ANSI92_INTER<br>9 = SQL_ANSI92_FULL |
| ClientTimZone | The time zone of the client machine |
| ClientLCID | The LCID value for the client collation |
| OffsetLength | The variable portion of this message. A stream of bytes in the order shown, indicates the offset (from the start of the message) and length of various parameters.<br>IbHostname & cchHostName - the client machine name<br>IbUserName & cchUserName - the client user id<br>IbPassword & cbPassword - the password supplied by the client<br>IbAppName & cchAppName - the client application name<br>IbServerName & cchServerName - the server name<br>IbRemPwd & cbRemPwd - the remote server/password pairs<br>ibCltIntName & cchCltIntName - the interface library name (ODBC)<br>ibLanguage & cchLanguage - the initial language (overrides the userid's default language)<br>ibDatabase & cchDatabase - the initial database (overrides the userid's default database)<br>ClientID - the unique client id (created used NIC address)<br>ibSSPI & cbSSPI - SSPI data.<br>If cbSSPI < USHRT_MAX, then this length is used for SSPI and cbSSPILong is ignored.<br>If cbSSPI == USHRT_MAX, then cbSSPILong is checked.<br>If cbSSPILong > 0, then use that value,<br>If cbSSPILong ==0, then use cbSSPI (USHRT_MAX)<br>ibAtchDBFile & cchAtchDBFile - the filename for a database that is to be attatched during the connection process<br>ibChangePassword & cbChangePassword - new password for the specified login.<br>cbSSPILong - Used for large SSPI data when cbSSPI==USHRT_MAX |
| Data | The actual variable length data portion referred to by OffsetLength |

RPC Request

Stream Name

RPCRequest

Stream Function

Request to execute a remote procedure call.

Stream Comments

To execute a remote procedure call on the server, the client sends a RPCRequest data stream to the server. This is a binary stream that contains the RPC Name (or ProcID), Options and Parameters. Each RPC must be contained within a separate message and not mixed with other SQL commands.

The message buffer header for a RPCRequest must indicate it is an RPCRequest data stream. Additionally, the total length of the RPCRequest data stream is indicated in the message buffer header.

Stream Specific Rules

| | |
|---|---|
| ProcID | :=USHORT; |
| ProcIDSwitch | :='0xFF', '0xFF';[1] |
| ProcName | :=US_VARCHAR; |
| NameLenProcID | :=ProcName<br>\|<br>ProcIDSwitch, ProcID; |
| fWithRecomp | :=BIT; |
| fNoMetaData | :=BIT; |
| OptionFlags | :=fWithRecomp, fNoMetaData, FRESERVEDBIT, FRESERVEDBIT, FRESERVEDBIT, FRESERVEDBIT, FRESERVEDBIT . FRESERVEDBIT, FRESERVEDBYTE; |

```
fParamLobIsCookie   :=BIT; // TDS 73 only
fByRefValue         :=BIT;
fDefaultValue       :=BIT;
StatusFlags         :=fByRefValue, fDefaultValue,
                      FRESERVEDBIT,
                      fParamLobIsCookie, FRESERVEDBIT,
                      FRESERVEDBIT,
                      FRESERVEDBIT, FRESERVEDBIT;
ParamMetaData       :=B_VARCHAR,
                      StatusFlags,
                      TYPE_INFO;
ParamLenData        :=TYPE_VARBYTE;
ParameterData       :=ParamMetaData,
                      ParamLenData;
BatchFlag           :='0x80';
RPCReqBatch         :=All_HEADERS,
                      NameLenProcID,
                      OptionFlags,
                      {ParameterData};
```

Note that the length for the instance value of UDTs is specified as a ULONGLONG

[Note: "ParameterData" is repeated once for each parameter in the request]

Stream Definition:

```
RPCRequest          :=RPCReqBatch,
                      [{BatchFlag, RPCReqBatch}];
```

[Note: "RPCReqBatch" is repeated once for each RFC in the batch]

[1] Note that all hex. values in the form of "0xNN" are always 1 byte in length per value.

TABLE 8

Stream Parameter Details

| Parameter | Description |
|---|---|
| ProcID | The number identifying the special stored procedure to be executed. The valid numbers with associated special stored procedure in the current TDS version are:<br>1. Sp_Cursor<br>2. Sp_CursorOpen<br>3. Sp_CursorPrepare<br>4. Sp_CursorExecute<br>5. Sp_CursorPrepExec<br>6. Sp_CursorUnprepare<br>7. Sp_CursorFetch<br>8. Sp_CursorOption<br>9. Sp_CursorClose<br>10. Sp_ExecuteSql<br>11. Sp_Prepare<br>12. Sp_Execute<br>13. Sp_PrepExec<br>14. Sp_PrepExecRpc<br>15. Sp_Unprepare |
| ProcIDSwitch | ProcIDSwitch may occur as part of NameLenProcID (see below) |
| ProcName | The procedure name length (within US_VARCHAR) |
| NameLenProcID | If the first USHORT contains "0xFFFF" the following USHORT contains the PROCID. Otherwise NameLenProcID contains the parameter name length and parameter name (see ParamName) |
| OptionFlags | Bit flags in least significant bit order:<br>fWithRecomp - set if RPC is sent with the "with recompile" option<br>fNoMetaData - set if no metadata is to be returned for the result set |
| StatusFlags | Bit flags in least significant bit order:<br>fByRefValue - set if the parameter is passed by reference (OUTPUT parameter) OR not set if parameter is passed by value<br>fDefaultValue - set if the parameter being passed is to be the default value |
| ParameterData | Contains the parameter name length and parameter name (within B_VARCHAR). Contains the TYPE_INFO of the RPC data. Contains the type dependant data for the RPC (within TYPE_VARBYTE). |
| BatchFlag | Used to distinguish the start of the next RPC from another parameter within the current RPC. Has a value of '0x80'. Only present if another RPC request is in the current batch. |

SQLBatch

Stream Name:

SQLBatch

Stream Function

Describes the format of the SQL Batch message

Stream Comments

---
Stream Specific Rules

SQLText         := UNICODESTREAM;
Stream Definition:

SQLBatch        :=ALL_HEADERS, SQLText;

---

The Unicode stream contains the TSQL text within the batch. An example stream would be: "Select author_id from Authors"

SSPI Message

Stream Name:

SSPIMessage

Stream Function

A request to supply data for SSPI security.

Stream Comments
  The initial SSPI data block is sent from the client to the server in the Login7 message.
  The server responds with an SSPI Token. The client responds with another SSPIMessage, after calling the SSPI interface with the server response.
  This continues until completion or an error.
  The server completes the SSPI validation and returns the last SSPI data block as a SSPI Token within a LoginACK Token.

---
Stream Specific Rules

SSPIData        :=BYTESTREAM;

---

-continued

---
Stream Definition

SSPIMessage     :=SSPIData;

---

Stream Parameter Details

TABLE 9

| Parameter | Description |
|---|---|
| SSPIDate | Contains the SSPIData length and SSPIData data (within US_VARCHAR). |

Transaction Manager Request

Stream Name:

TransMgrReq

Stream Function:
  Request to perform transaction coordination through a Distributed Transaction Coordinator (DTC) implemented to the Microsoft DTC Interface Specification.

Stream Comments
  The Message Buffer Header associated with the TransMgrReq must contain the Transaction Manager Type (14 decimal)

---
Stream Specific Rules

RequestType         :=USHORT;
Stream Definition

TransMgrReq         :=ALL_HEADERS,
                      RequestType,
                      RequestPayload;

---

TABLE 10

Stream Parameter Details

| Parameter | Description |
|---|---|
| RequestType | The type of Transaction Manager operation desired by the client:<br>0 = TM_GET_DTC_ADDRESS (returns DTC network address as ENVCHANGE type 16)<br>1 = TM_PROPAGATE_XACT (import DTC transaction into server and returns a local transaction descriptor in an ENVCHANGE type 11)<br>5 = TM_BEGIN_XACT (Begins a transaction, and returns the descriptor in an ENVCHANGE type 8.<br>6 = TM_PROMOTE_PROMOTABLE_XACT (promote local transaction to DTC and returns an opaque buffer in an ENVCHANGE type 15)<br>7 = TM_COMMIT_XACT (Commits a transaction. Depending on payload of the request, it can additionally request that another local transaction be started)<br>8 = TM_ROLLBACK_XACT (Rolls back a transaction. Depending on the payload of the request it can indicate that after the rollback, a local transaction is to be started.)<br>9 = TM_SAVE_XACT (Sets a savepoint within the active |

TABLE 10-continued

Stream Parameter Details

| Parameter | Description |
|---|---|
| | transaction. This request must specify a non-empty name for the savepoint.) |
| | TM_GET_DTC_ADDRESS - no data (i.e. the value of the length field in the US_VARBYTE is zero, indicating no data follows the length) |
| | TM_PROPAGATE_XACT - data contains an opaque buffer used by the server to enlist in a DTC transaction |
| | For downlevel clients: |
| | RequestPayload     :=     US_VARBYTE; |
| | For Yukon clients: |
| | RequestPayload     :=     L_VARBYTE; |
| | TM_BEGIN_XACT |
| | RequestPayload     :=     ISOLATION_LEVEL, BEGIN_XACT NAME; |
| | ISOLATION_LEVEL     := BYTE; |
| | BEGIN_XACT_NAME     := B_VARCHAR; |
| | This request begins a new transaction, or increments trancount if already in a transaction. This is equivalent to T-SQL: |
| | BEGIN TRAN; |
| | If BEGIN_XACT_NAME is non-empty, a transaction is started with the specified name. |
| | This is equivalent to: |
| | BEGIN TRAN name; |
| | See definition for isolation level at the end of this table. If ISOLATION_LEVEL is non-zero, then this request is semantically prepended by: |
| | SET TRANSACTION ISOLATION LEVEL isolevel; |
| | TM_PROMOTE_XACT - no data |
| | This message promotes the transaction of the current request (specified in the MARS header). Current transaction must be part of the specified header. |
| | Note that TM_PROMOTE_XACT is supported only for transactions initiated via TM_BEGIN_XACT, or via piggybacked operation on TM_COMMIT/TM_ROLLBACK. An error is returned if TM_PROMOTE is invoked for a TSQL initiated transaction. |
| | TM_COMMIT_XACT |
| | RequestPayload     := XACT NAME, |
| |                         XACT_FLAGS, |
| |                         ISOLATION_LEVEL, |
| |                         BEGIN_XACT_NAME; |
| | XACT_FLAGS     := |
| |                         fBeginXact, |
| |                         FRESERVEDBIT, |
| |                         FRESERVEDBIT, |
| |                         FRESERVEDBIT, |
| |                         FRESERVEDBIT, |
| |                         FRESERVEDBIT, |
| |                         FRESERVEDBIT, |
| |                         FRESERVEDBIT, |
| | fBeginXact              := BIT; |
| | ISOLATION_LEVEL     := BYTE; |
| | XACT_NAME     := B_VARCHAR; |
| | BEGIN_XACT_NAME     := B_VARCHAR; |
| | Without additional flags specified, this command is semantically equivalent to issuing a TSQL COMMIT statement. |
| | If XACT_NAME is non-empty, this request is semantically equivalent to: |
| | COMMIT TRAN name; |
| | If fBeginXact is 1, then a new local transaction is started after the commit operation is done. This operation is semantically equivalent to: |
| |     COMMIT TRAN; |
| |     If (@@trancount = 0) |
| |         BEGIN TRAN; |
| | If fBeginXact is 1, then ISOLATION_LEVEL can specify the isolation level to use to start the new transaction, according to the definition at the end of this table. If fBeginXact is 0, then ISOLATION_LEVEL must be 0. |
| | Specifying ISOLATION_LEVEL is semantically equivalent to prepending |
| | SET TRANSACTION ISOLATION LEVEL isolevel; |
| | before the request. As such, the isolation level remains in effect for the session, once the xact ends. |
| | If fBeginXact is 0, BEGIN_XACT_NAME must be empty. If fBeginXact is 1, BEGIN_XACT_NAME may be non-empty. |
| | If BEGIN_XACT_NAME is non-empty, a transaction is started with the specified name. |
| | This is equivalent to: |
| | BEGIN TRAN name; |
| | TM_ROLLBACK_XACT |
| | RequestPayload     :=     XACT NAME, |

TABLE 10-continued

Stream Parameter Details

| Parameter | Description |
|---|---|
| | XACT_FLAGS, ISOLATION_LEVEL, BEGIN_XACT_NAME; |
| XACT_FLAGS := fBeginXact, | |
| | FRESERVEDBIT, |
| | FRESERVEDBIT, |
| | FRESERVEDBIT, |
| | FRESERVEDBIT, |
| | FRESERVEDBIT, |
| | FRESERVEDBIT, |
| | FRESERVEDBIT, |
| fBeginXact := BIT; | |
| ISOLATION_LEVEL := BIT, BIT, BIT; | |
| XACT_NAME := B_VARCHAR; | |
| BEGIN_XACT_NAME := B_VARCHAR; | |
| If XACT_NAME is non-empty, this request is semantically equivalent to: | |
| ROLLBACK TRAN xact_name; | |
| This implies that if XACT_NAME specifies a savepoint name, the rollback only goes back until the specified savepoint. | |
| Without additional flags specified, this command is semantically equivalent to issuing a TSQL ROLLBACK statement under the current transaction. | |
| If fBeginXact is 1, then a new local transaction is started after the commit operation is done. This operation is semantically equivalent to: | |
| ROLLBACK TRAN; | |
| BEGIN TRAN; | |
| If fBeginXact is 1, then ISOLATION_LEVEL can specify the isolation level to use to start the new transaction, according to the definition at the end of this table. If fBeginXact is 0, then ISOLATION_LEVEL must be 0. | |
| Specifying ISOLATION_LEVEL is semantically equivalent to pre pending SET TRANSACTION ISOLATION LEVEL isolevel; before the request. As such, the isolation level remains in effect for the session, once the xact ends. | |
| If fBeginXact is 0, BEGIN_XACT_NAME must be empty. If fBeginXact is 1, BEGIN_XACT_NAME may be non-empty. | |
| If BEGIN_XACT_NAME is non-empty, a transaction is started with the specified name. | |
| This is equivalent to: | |
| BEGIN TRAN name; | |
| If fBeginXact is 1, and the ROLLBACK only rolled back to a savepoint, the Begin_Xact operation is ignored and trancount remains unchanged. | |
| TM_SAVE_XACT | |
| RequestPayload := XACT_SAVEPOINT_NAME; | |
| XACT_SAVEPOINT_NAME := B_VARCHAR; | |
| A non-empty name must be specified as part of this request. Otherwise an error is raised. | |
| This request is semantically equivalent to issuing the following TSQL command: | |
| SAVE TRAN name; | |

Possible values for ISOLATION_LEVEL:

| | | |
|---|---|---|
| 0x00 | := | No isolation level change requested. Use current. |
| 0x01 | := | Read Uncommitted |
| 0x02 | := | Read Committed |
| 0x03 | := | Repeatable Read |
| 0x04 | := | Serializable |
| 0x05 | := | Snapshot |

Token Stream Definitions

ALTMETADATA

Token Stream Name

ALTMETADATA

Token Stream Function

Describes the data type, length and name of compute column data.

Token Stream Comments

The token value is 0x88/136.

This token is used to tell the client what data type and length the compute column data is.

It describes the format of the data found in an ALTROW data stream.

All ALTMETADATA data streams are grouped together.

This stream doesn't occur without a preceding COL-METADATA, though there could be COLINFO and TABNAME streams in between.

Token Stream Specific Rules

| | |
|---|---|
| TokenType | :=BYTE; |
| Count | :=USHORT; |
| Id | :=USHORT; |
| ByCols | :=UCHAR; |
| Op | :=BYTE; |
| Operand | :=USHORT; |

-continued

```
UserType             :=USHORT;
fNullable            :=BIT;
fCaseSen             :=BIT;
usUpdateable         :=BIT, BIT; //2-bit value
                     //0 = Readonly
                     //1 = ReadWrite
                     //2 = Unknown (maybe readonly,
                        maybe readwrite)
fIdentity            :=BIT;
fComputed            :=BIT;
usReservedODBC       :=BIT, BIT;
fFixedLenCLRType     :=BIT;
usReserved           :=BIT, BIT, BIT, BIT, BIT, BIT;
Flags                :=fNullable, fCaseSen, usUpdateable,
                        fIdentity, fComputed,
                        usReservedODBC, fFixedLenCLRType,
                        usReserved, fUnset;
TableName            :=US_VARCHAR;
ColName              :=B_VARCHAR;
ComputeData          :=Op,
                        Operand,
                        UserType,
                        Flags,
                        TYPE_INFO,
                        [TableName],
                        ColName;
```
[Note: "TableName" is only specified if text, ntext or image columns are included in the resultset.]

Token Stream Definition

```
ALTMETADATA          := TokenType,
                        Count,
                        Id,
                        ByCols,
                        {ColNum},
                        {ComputeData};
```
[Note: "ColNum" is repeated "ByCols" times, and "ComputeData" is repeated "Count" times]

TABLE 11

Token Stream Parameter Details

| Parameter | Description |
|---|---|
| TokenType | ALTMETEDATA_TOKEN |
| Count | The count of columns (number of aggregate operators) in the token stream. |
| Id | The id of the compute statement to which the compute column formats apply. This Id lets the client correctly interpret later ALTROW data streams. |
| ByCols | The number of columns in the by list of the compute clause. For example, the compute clause compute count(sales) by year, month, division, department has 4 by columns. |
| Op | The type of aggregate operator. For the aggregate operands, see ByCols and ColNum. |
| Operand | The column number in the select list that is the operand to the aggregate operator. |
| UserType | The user-defined data type of the column. |
| Flags | Bit flags in least significant bit order:<br>fCaseSensitive is a bit flag, TRUE if the column is case sensitive for searches. (Not implemented in MS SQL Server).<br>fNullable is a bit flag, TRUE if the column is nullable.<br>fUpdateable is a 2 bit field, 0 if column is read-only, 1 if column is read/write and 2 if updateable is unknown. (Not implemented in MS SQL Server).<br>fIdentity is a bit flag, TRUE if the column is an identity column.<br>fReservedODBC is a 2 bit field that is used by ODS gateways supporting the ODBC ODS gateway driver. |
| TableName | The fully qualified base table name for this column. Contains the table name length and table name. This exists only for text or image columns. |

TABLE 11-continued

Token Stream Parameter Details

| Parameter | Description |
|---|---|
| ColName | The column name. Contains the column name length and column name. |

ALTROW

Token Stream Name

ALTROW

Token Stream Function:

Used to send a complete row of computed data, where the data format is provided by the ALTMETADATA token.

Token Stream Comments

The token value is 0xD3/211.

Similar to the ROW_TOKEN yet contains an "Id" field. This Id matches an Id given in ALTMETADATA (one Id for each compute clause). This provides the mechanism for matching row data with correct compute statements.

Token Stream Specific Rules

```
TokenType            :=BYTE;
Id                   :=USHORT;
TextPointer          :=B_VARBYTE;
TimeStamp            :=BYTE * 8;
Data                 :=TYPE_VARBYTE;
ComputeData          :=TextPointer,
                        [TimeStamp],
                        Data;
```

Token Stream Definition

```
ALTMETADATA          :=TokenType,
                        Id,
                        {ComputeData};
```
[Note: "ComputeData" is repeated "Count" times (where "Count" is specified in ALTMETADATA_TOKEN)]

TABLE 12

Token Stream Parameter Details

| Parameter | Description |
|---|---|
| TokenType | ALTROW_TOKEN |
| Id | The id of the compute statement to which the compute column formats apply. This Id lets the client correctly interpret later ALTROW data streams. |
| TextPointer | The length of the text pointer and the text pointer (within B_VARBYTE) for Data. |
| TimeStamp | The timestamp of the text/image column. This is not present if the value of Data is CHARBIN_NULL or GEN_NULL. |
| Data | The actual data for the column. The TYPE_INFO information describing the datatype of this data is given in the proceeding COLMETADATA_TOKEN, ALTMETDATA_TOKEN or OFFSET_TOKEN. |

COLMETADATA

Token Stream Name

COLMETADATA

Token Stream Function

Describes the result set for interpretation of following ROW datastreams.

Token Stream Comments
　　The token value is 0x81/136.
　　This token is used to tell the client what data type and length the compute column data is.
　　It describes the format of the data found in a ROW datastream.
　　All COLMETADATA data streams are grouped together.

| Token Stream Specific Rules | | |
|---|---|---|
| TokenType | := | BYTE; |
| Count | := | USHORT; |
| UserType | := | USHORT; |
| fNullable | := | BIT; |
| fCaseSen | := | BIT; |
| usUpdateable | := | BIT, BIT; //2-bit value<br>//0 = ReadOnly<br>//1 = ReadWrite<br>//2 = Unknown (maybe readonly, maybe readwrite) |
| fIdentity | := | BIT; |
| fComputed | := | BIT; |
| usReservedODBC | := | BIT, BIT; |
| fFixedLenCLRType | := | BIT; |
| usReserved | := | BIT, BIT, BIT, BIT, BIT, BIT; |
| fReservedODBC | := | BIT, BIT; |
| Flags | := | fNullable, fCaseSen, usUpdateable, fIdentity, fComputed, usReservedODBC, fFixedLenCLRType, usReserved, fUnset; |
| TableName | := | US_VARCHAR; |
| ColName | := | B_VARCHAR; |
| ColumnData | := | UserType,<br>Flags,<br>TYPE_INFO,<br>[TableName], // <Only specified if text,<br>　　　　　　　　//ntext or image columns<br>　　　　　　　　are included<br>　　　　　　　　//in the rowset being described><br>CdName; |
| NoMetaData | := | '0 x FF', '0 x FF' |
| [Note: "TableName" is only specified if text, ntext or image columns are included in the resultset.] | | |
| Token Stream Definition | | |
| COLMETADATA | := | TokenType,<br>NoMetaData<br>(Count, {ColumnData}); |
| [Note: "ComlumnData" is repeated "Count" times. See Count below] | | |

TABLE 13

| Token Stream Parameter Details | |
|---|---|
| Parameter | Description |
| TokenType | COLMETADATA_TOKEN |
| Count | The count of columns (number of aggregate operators) in the token stream. In the event the client requested no metadata to be returned (see OptionFlags parameter in RPCRequest token) the value of Count will be 0xFFFF. This has the same effect on Count as a zero value (i.e. no ComputeData is sent). |
| UserType | The user-defined data type of the column. Note that this is also used to track type id of system defined UDTs (e.g. utcdatetime) |
| Flags | Bit flags in least significant bit order:<br>fCaseSensitive is a bit flag, TRUE if the column is case sensitive for searches. (Not implemented in MS SQL Server).<br>fNullable is a bit flag, TRUE if the column is nullable. |

TABLE 13-continued

| Token Stream Parameter Details | |
|---|---|
| Parameter | Description |
| | fUpdateable is a 2 bit field, 0 if column is read-only, 1 if column is read/write and 2 if updateable is unknown. (Not implemented in MS SQL Server).<br>fIdentity is a bit flag, TRUE if the column is an identity column.<br>fReservedODBC is a 2 bit field that is used by ODS gateways supporting the ODBC ODS gateway driver. |
| TableName | The fully qualified base table name for this column. Contains the table name length and table name. This exists only for text or image columns. |
| ColName | The column name. Contains the column name length and column name. |

COLINFO

Token Stream Name

COLINFO

Token Stream Function

Describes the column information in browse mode, sp_cursoropen and sp_cursorfetch.

Token Stream Comments
　　The token value is 0xA5/165.
　　The TABNAME token contains the actual tablename associated with COLINFO.

| Token Stream Specific Rules | |
|---|---|
| TokenType | :=BYTE; |
| Length | :=USHORT; |
| ColNum | :=BYTE; |
| TableNum | :=BYTE; |
| Status | :=BYTE; |
| ColName | :=US_VARCHAR; |
| ColInfo | :=ColNum,<br>TableNum,<br>Status,<br>[ColName]; |
| [Note: "ColINfo" is repeated for each column in the result set] | |
| Token Stream Definition | |
| COLINFO | :=TokenType,<br>Length,<br>COLInfo; |

TABLE 14

| Token Stream Parameter Details | |
|---|---|
| Parameter | Description |
| TokenType | COLINFO_TOKEN |
| Length | The total length of the COLINFO datastream |
| ColNum | The column number in the result set. |
| TableNum | The number of the base table the the column was derived from. The value is 0 if the value of Status is EXPRESSION. |
| Status | 0x4 - EXPRESION (the column was the result of an expression<br>0x8 - KEY (the column is part of a key for the associated table)<br>0x10 - HIDDEN (the column was not a member of the selected list, but was added because it was part of a key for the associated table) |

TABLE 14-continued

Token Stream Parameter Details

| Parameter | Description |
|---|---|
| | 0x20 - DIFFERENT_NAME (the column name is different than the selected list column name |
| ColName | The base column name. This only occurs if DIFFERENT_NAME is set in Status |

DEBUG_CMD

Token Stream Name

DEGUG_CMD

Token Stream Function

Outputs a raw page from the server.

Token Stream Comments

The token value is 0x60/96.

Token Stream Specific Rules

| | |
|---|---|
| TokenType | :=BYTE; |
| Length | :=LONG; |
| Zero | :=LONG; |
| Page | :=2048 * BYTE; |

Token Stream Definition

| | |
|---|---|
| DEBUG_CMD | :=TokenType, Length, Zero, Page; |

TABLE 15

Token Stream Parameter Details

| Parameter | Description |
|---|---|
| TokenType | DEBUG_CMD_TOKEN |
| Length | The total length of the DEBUG_CMD datastream |
| Zero | Contains zeros |
| Page | The raw bytes of the page |

DONE

Token Stream Name

DONE

Token Stream Function

Indicates the completion status of a command.

Token Stream Comments

The token value is 0xFD/253.

This token is used to indicate the completion of a command. Since multiple commands may be sent to the server in a single batch, multiple DONE tokens may be generated. In this case, all but the final DONE token will have a Status value of DONE_MORE (see below for more details).

For Ad-Hoc SQL command batches, one DONE token is returned for each statement[2] in the batch.

[2] "Statements" is defined as "all T-SQL statements except variable declarations".

For execution of commands within stored procedures, DONEPROC and DONEINPROC tokens are used in place of DONE tokens.

Token Stream Specific Rules

| | |
|---|---|
| TokenType | :=BYTE; |
| Status | :=USHORT; |
| CurCmd | :=USHORT; |
| DoneRowCount | :=LONG; |

Token Stream Definition

| | |
|---|---|
| DONE | :=TokenType, Status, CurCmd, DoneRowCount; |

TABLE 16

Token Stream Parameter Details

| Parameter | Description |
|---|---|
| TokenType | DONE_TOKEN |
| Status | 0x1 - DONE_MORE (this DONE message is not the final DONE message in the result batch. Results for the next command are to follow) |
| | 0x2 - DONE_ERROR (on error occurred on the current command) |
| | 0x4 - DONE_INXACT (a transaction is in progress). Note: this bit is not set by SQL Server, and should be considered "reserved for future use" |
| | 0x8 - DONE_PROC (the DONE messages results from the execution of a stored procedure) |
| | 0x10 - DONE_COUNT (the Count value is valid. This is used to distinguish between a valid value of 0 for Count or just an initialized variable) |
| | 0x20 - DONE_ATTN (the DONE message is a server acknowledgement of a client ATTENTION message) |
| | 0x100 - DONE_SRVERROR (Used in place of DONE_ERROR when an error occurred on the current command which is severe enough to require the result set (if any) to be discarded) |
| CurCmd | Contains the token of the current command (see Appendix A for a list of Server tokens). |
| DoneRowCount | The count of rows that were affected by the command. The value of Count is valid if the value of Status includes DONE_COUNT. |

DONEPROC

Token Stream Nam

DONEPROC

Token Stream Function

Indicates the completion status of commands within a stored procedure.

Token Stream Comments

The token value is 0xFE/254.

A DONEPROC token is sent when all the statements within a stored procedure have been executed.

If a stored procedure calls another stored procedure the DONE_MORE bit is set in the Status value.

A DONEPROC token may be followed by another DONEPROC token, or a DONEINPROC only if the DONE_MORE bit is set in the Status value.

There is a separate DONEPROC token sent for each stored procedure called.

Token Stream Specific Rules

```
TokenType       :=BYTE;
Status          :=USHORT;
CurCmd          :=USHORT;
DoneRowCount    :=LONG;
```

Token Stream Definition

```
DONEPROC        :=TokenType,
                  Status,
                  CurCmd,
                  DoneRowCount;
```

TABLE 17

Token Stream Parameter Details

| Parameter | Description |
|---|---|
| TokenType | DONEPROC_TOKEN |
| Status | 0x1 - DONE_MORE (this DONE message is not the final DONE message in the result batch. Results for the next command are to follow) <br> 0x2 - DONE_ERROR (on error occurred on the current command) <br> 0x4 - DONE_INXACT (a transaction is in progress). Note: this bit is not set by SQL Server and should be considered "reserved for future use." <br> 0x8 - DONE_PROC (the DONE messages results from the execution of a stored procedure) <br> 0x10 - DONE_COUNT (the Count value is valid. This is used to distinguish between a valid value of 0 for Count or just an initialized variable) <br> 0x40 - DONE_INPROC (the procedure contains a statement that failed. No DONEPROC message is returned. <br> 0x80 - DONE_RPCINBATCH (the DONE message is associated with an RPC within a set of batched RPC's. This flag is not set on the last RPC in the batch. <br> 0x100 - DONE_SRVERROR (Used in place of DONE_ERROR when an error occurred on the current command which is severe enough to require the result set (if any) to be discarded) |
| CurCmd | Contains the token of the current command for a list of Server tokens. (see Appendix A for a list of Server tokens). |
| DoneRowCount | The count of rows that were affected by the command. The value of Count is valid if the value of Status includes DONE_COUNT. |

DONEINPROC

Token Stream Name

DONEINPROC

Token Stream Function

Indicates the completion status of commands within a stored procedure.

Token Stream Comments

The token value is 0xFF/255

A DONEINPROC token is sent for each executed statement in within a stored procedure.

A DONEINPROC token is guaranteed to be followed by another DONEPROC token, or a DONEINPROC.

Token Stream Specific Rules

```
TokenType       :=BYTE;
Status          :=USHORT;
CurCmd          :=USHORT;
DoneRowCount    :=LONG;
```

Token Stream Definition

```
DONEINPROC      :=TokenType,
                  Status,
                  CurCmd,
                  DoneRowCount;
```

TABLE 18

Token Stream Parameter Details

| Parameter | Description |
|---|---|
| TokenType | DONEINPROC_TOKEN |
| Status | 0x1 - DONE_MORE (this DONE message is not the final DONE message in the result batch. Results for the next command are to follow) <br> 0x2 - DONE_ERROR (on error occurred on the current command) <br> 0x4 - DONE_INXACT (a transaction is in progress). Note: this bit is not set by SQL Server and should be considered "reserved for future use." <br> 0x8 - DONE_PROC (the DONE messages results from the execution of a stored procedure) <br> 0x10 - DONE_COUNT (the Count value is valid. This is used to distinguish between a valid value of 0 for Count or just an initialized variable) <br> 0x40 - DONE_INPROC (the procedure contains a statement that failed. No DONEPROC message is returned. <br> 0x80 - DONE_RPCINBATCH (the DONE message is associated with an RPC within a set of batched RPC's. This flag is not set on the last RPC in the batch. <br> 0x100 - DONE_SRVERROR (Used in place of DONE_ERROR when an error occurred on the current command which is severe enough to require the result set (if any) to be discarded) |
| CurCmd | Contains the token of the current command (see Appendix A for a list of Server tokens). |
| DoneRowCount | The count of rows that were affected by the command. The value of Count is valid if the value of Status includes DONE_COUNT. |

ENVCHANGE

Token Stream Name

ENVCHANGE

Token Stream Function

A notification of an environment change (e.g. database, language etc.)

Token Stream Comments

The token value is 0xE3/227

Includes old and new environment values

Type 13 (Database Mirroring) is sent in response to a login7 message whenever connection is requested to a database that it is being served as primary in real time log shipping. The ENVCHANGE stream reflects the name of the partner node of the database is being log shipped.

Type 15 (Promote Transaction) is sent in response to Transaction Manager Requests, with requests of type 6 (TM_PROMOTE_XACT)

Type 16 (Transaction Manager Address) is sent in response to Transaction Manager Requests, with requests of type 0 (TM_GET_DTC_ADDRESS)

```
Token Stream Specific Rules

TokenType        :=BYTE;
Length           :=USHORT;
Type             :=BYTE;
NewValue         :=B_VARBYTE;
OldValue         :=B_VARBYTE;
EnvValueData     :=Type,
                   NewValue,
                   [OldValue];
EnvValueChg      :={EnvValueData};
```

[Note: "EnvValueData" is repeated once for each environment value that has changed]

Token Stream Definition

ENVCHANGE := TokenType, Length, EnvValueChg;

TABLE 19

Token Stream Parameter Details

| Parameter | Description |
|---|---|
| TokenType | ENVCHANGE_TOKEN |
| Length | The total length of the ENVCHANGE datastream (EnvValueCh) |
| Type | The type of environment change:<br>1 - Database<br>2 - Language<br>3 - Character set<br>4 - Packet size<br>5 - Unicode data sorting local id<br>6 - Unicode data sorting comparison flags<br>7 - SQL Collation<br>8 - Begin Transaction<br>9 - Commit Transaction<br>10 - Rollback Transaction<br>11 - Enlist DTC Transaction<br>12 - Defect Transaction<br>13 - Real Time Log Shipping<br>15 - Promote Transaction<br>16 - Transaction Manager Address<br>17 - Transaction ended<br>18 - sp_reset connection Completion Acknowledgement. |

| Type | Old Value | New Value |
|---|---|---|
| 1 - Database | OLD_VALUE:=B_VARBYTE; | NEW_VALUE:=B_VARBYTE; |
| 2 - Language | OLD_VALUE:=B_VARBYTE; | NEW_VALUE:=B_VARBYTE; |
| 3 - Character Set | OLD_VALUE:=B_VARBYTE; | NEW_VALUE:=B_VARBYTE; |
| 4 - Packet Size | OLD_VALUE:=B_VARBYTE; | NEW_VALUE:=B_VARBYTE; |
| 5 - Unicode data sorting local id | OLD_VALUE:=B_VARBYTE; | NEW_VALUE:=B_VARBYTE; |
| 6 - Unicode data sorting comparison flags | OLD_VALUE:=B_VARBYTE; | NEW_VALUE:=B_VARBYTE; |
| 7 - SQL Collation | OLD_VALUE:=B_VARBYTE; | NEW_VALUE:=B_VARBYTE; |
| 8 - Begin Transaction | OLD_VALUE:=B_VARBYTE; | NEW_VALUE:=B_VARBYTE; |
| 9 - Commit Transaction | OLD_VALUE:=B_VARBYTE; | OLD_VALUE:=B_VARBYTE; |
| 10 - Rollback Transaction | OLD_VALUE:=B_VARBYTE; | OLD_VALUE:=B_VARBYTE; |
| 11 - Enlist DTC Transaction | OLD_VALUE:=B_VARBYTE; | NEW_VALUE:=B_VARBYTE; |
| 12 - Defect Transaction | OLD_VALUE:=B_VARBYTE; | OLD_VALUE:=B_VARBYTE; |
| 13 - Database Mirroring Partner | OLD_VALUE:='0x00'; | PARTNER_NODE := B_VARBYTE;<br>NEW_VALUE:= PARTNER_NODE; |
| 15 - Promote Transaction | OLD_VALUE:=B_VARBYTE; | DTC_TOKEN:=L_VARBYTE;<br>NEW_VALUE:=DTC_TOKEN; |
| 16 - Transaction Manager Address | OLD_VALUE:=B_VARBYTE; | XACT_MANAGER_ADDRESS:=B_VARBYTE;<br>NEW_VALUE:= XACT_MANAGER_ADDRES; |

-continued

| Type | Old Value | New Value |
|---|---|---|
| 17 - Transaction Ended | OLD_VALUE:=B_VARBYTE; | OLD_VALUE:=B_VARBYTE; |
| 18 - sp_resetconnection Completion Acknowledgement | OLD_VALUE:='0x00'; | NEW_VALUE:='0x00'; |

For Types 8, 9, 10, 11, 12 the ENVCHANGE event is returned only if the transaction lifetime is controlled by the user i.e. explicit transaction commands, including transactions started by SET IMPLICIT_XACT ON.
For ENVCHANGE types 8, 9, 10, 11, 12, 15, 16, 17 the definition of OLD_VALUE is an empty B_VARBYTES. i.e.
OLD_VALUE:='0x00';
For ENVCHANGE types 8, 9, 10, 11, 12, 17 the payload of NEW_VALUE is a ULONGLONG.
NEW_VALUE:=    '0x08', //size of ULONGLONG
               ULONGLONG;
ENVCHANGE type 12 is only sent when a batch defects from either a DTC or bound session transaction.
ENVCHANGE type 17 is sent for a batch that specified a descriptor for a transaction that has ended.
(e.g.
batch 1: begin xact_1;
batch 1 (under xact_1): select_statement + commit;
batch 2 (under xact_1): select statement;
If batch 1 commits before batch 2 gets to run, batch 2 receives ENVCHANGE type 17.)
ENVCHANGE TYPE 18 always produces empty (0x00) old and new values. It simply acknowledges completion of execution of a reset connection request.
Note: LENGTH for ENVCHANGE type 15 is sent as 0x01 indicating only the length of the type token. Client drivers are responsible for reading the additional payload if type is == 15.

ERROR

Token Stream Name

ERROR

Token Stream Function

Used to send an error message to the client.

Token Stream Comments

The token value is 0xAA/170

| Token Stream Specific Rules | |
|---|---|
| TokenType | :=BYTE; |
| Length | :=USHORT; |
| Number | :=LONG; |
| State | :=BYTE; |
| Class | :=BYTE; |
| MsgText | :=US_VARCHAR; |
| ServerName | :=B_VARCHAR; |
| ProcName | :=B_VARCHAR; |
| LineNumber | :=USHORT; |
| Token Stream Definition | |
| ERROR | :=TokenType, Length, Number, State, Class, MsgText, ServerName, ProcName, LineNumber; |

TABLE 20

| Token Stream Parameter Details | |
|---|---|
| Parameter | Description |
| TokenType | ERROR_TOKEN |
| Length | The total length of the ERROR datastream |
| Number | The error number (number below 20001 are reserved by the Server) |
| State | The error state, used as a modifier to the error number. |
| Class | The class/severity of the error (a class of <10 indicates an informational message). |
| MsgText | Contains the message text length and message text (within US_VARCHAR) |
| ServerName | Contains the server name length and server name (within B_VARCHAR) |
| ProcName | Contains the stored procedure name length and the stored procedure name (within B_VARCHAR). |
| LineNumber | The line number in the SQL command batch or stored procedure that caused the error. Line numbers begin at 1, as such if the line number is not applicable to the message the value of LineNumber will be 0. |

If an error is produced within a result set, the ERROR token is sent before the DONE token for the statement, and such DONE token is sent with the error bit set.

INFO

Token Stream Name

INFO

Token Stream Function

Used to send an information message to the client.

Token Stream Comments

The token value is 0xAB/171

Token Stream Specific Rules

```
TokenType      :=BYTE;
Length         :=USHORT;
Number         :=LONG;
State          :=BYTE;
Class          :=BYTE;
MsgText        :=US_VARCHAR;
ServerName     :=B_VARCHAR;
ProcName       :=B_VARCHAR;
LineNumber     :=USHORT;
```

Token Stream Definition

```
INFO           :=TokenType,
                 Length,
                 Number,
                 State,
                 Class,
                 MsgText,
                 ServerName,
                 ProcName,
                 LineNumber;
```

TABLE 21

Token Stream Parameter Details

| Parameter | Description |
| --- | --- |
| TokenType | INFO_TOKEN |
| Length | The total length of the INFO datastream |
| Number | The info number (number below 20001 are reserved by the DataServer) |
| State | The error state, used as a modifier to the info Number. |
| Class | The class/severity of the error (a class of <10 indicates an informational message). |
| MsgText | Contains the message text length and message text (within US_VARCHAR) |
| ServerName | Contains the server name length and server name (within B_VARCHAR) |
| ProcName | Contains the stored procedure name length and the stored procedure name (within B_VARCHAR). |
| LineNumber | The line number in the SQL command batch or stored procedure that caused the error. Line numbers begin at 1, as such if the line number is not applicable to the message the value of LineNumber will be 0. |

LOGINACK

Token Stream Name

LOGINACK

Token Stream Function

Used to send a response to a login request (LOGIN7) to the client.

Token Stream Comments

The token value is 0xAD/173

If a LOGINACK is not received by the client as part of the login procedure, the logon to the server is unsuccessful.

Token Stream Specific Rules

```
TokenType      :=BYTE;
Length         :=USHORT;
Interface      :=BYTE;
TDSVersion     :=DWORD;
ProgName       :=B_VARCHAR;
MajorVer       :=BYTE;
MinorVer       :=BYTE;
BuildNumHi     :=BYTE;
BuildNumLow    :=BYTE;
ProgVersion    :=MajorVer,
                 MinorVer,
                 BuildNumHi,
                 BulldNumLow;
```

Token Stream Definition

```
LOGINACK       :=TokenType,
                 Length,
                 Interface,
                 TDSVersion,
                 ProgName,
                 ProgVersion;
```

TABLE 22

Token Stream Parameter Details

| Parameter | Description |
| --- | --- |
| TokenType | LOGINACK_TOKEN |
| Length | The total length of the LOGINACKdatastream |
| Interface | The type of interface with which the server will accept client requests:<br>0 - LDEFSQL (server assumes whatever is sent by the client is acceptable)<br>1 - LXSQL (TSQL is accepted)<br>2 - LSQL (ANSI SQL Version 1 is accepted)<br>3 - LSQL2_1 (ANSI SQL Version 2, level 1 is accepted)<br>4 - LSQL2_2 (ANSI SQL Version 2, level 2 is accepted) |
| TDSVersion | The TDS version being used by the server (e.g. 0x70000000 for a 7.0 server)<br>The following liststhe version numbers used by the server up to SQL Server 2000 (Shiloh) SP1.<br>7.0 (Sphinx): 0x70 00 00 00<br>7.1 (Shiloh): 0x70 01 00 00 [note: this is different from the client]<br>7.1 SP1: 0x71 00 00 01 |
| ProgName | The name of the server (i.e. "Microsoft SQL Server") |
| MajorVer | The major verson number (0-255). |
| MinorVer | The Minor Version number (0-255). |
| BuildNumHi | The Hi-Byte of the build number (0-255) |
| BuildNumLow | The Low-Byte of the build number (0-255) |

OFFSET

Token Stream Name

OFFSET

Token Stream Function

Used to inform the client where in the clients command buffer a particular keyword occurs.

Token Stream Comments

The token value is 0x78/120

Token Stream Specific Rules

```
TokenType      :=BYTE;
Indentifier    :=USHORT;
Offset         :=USHORT;
```

Token Stream Definition

```
OFFSET         :=TokenType,
                 Indentifier,
                 Offset;
```

TABLE 23

Token Stream Parameter Details

| Parameter | Description |
|---|---|
| TokenType | OFFSET_TOKEN |
| Identifier | The keyword to which OffSet refers. |
| Offset | The offset in the command buffer received by the server of the Identifier. The command buffer begin with an OffSet value of 0 (MOD 64K if value of OffSet larger than 64K). |

ORDER

Token Stream Name

ORDER

Token Stream Function

Used to inform the client which columns are located within an "order by" clause.

Token Stream Comments

The token value is 0xA9/169

This token is only sent in the event an "order by" clause is executed.

---

Token Stream Specific Rules

```
TokenType            :=BYTE;
Length               :=USHORT;
ColNum               :={USHORT};
[Note: "ColNum" is repeated once for each column within
the "order by" clause]
Token Stream Definition
ORDER                :=TokenType,
                       Length,
                       ColNum;
```

TABLE 24

Token Stream Parameter Details

| Parameter | Description |
|---|---|
| TokenType | ORDER_TOKEN |
| Length | The total length of the ORDER datastream. |
| ColNum | The column number in the result set. |

RETURNSTATUS

Token Stream Name

RETURNSTATUS

Token Stream Function:

Used to send the status value of a RPC to the client.

Token Stream Comments

The token value is 0x79/121

This token is always returned to the client when an RPC is executed by the server.

---

Token Stream Specific Rules

```
TokenType            :=BYTE;
Value                :=LONG;
```

Token Stream Definition

```
RETURNSTATUS         :=TokenType,
                       Value;
```

TABLE 25

Token Stream Parameter Details

| Parameter | Description |
|---|---|
| TokenType | RETURNSTATUS_TOKEN |
| Value | The return status value (return status cannot be NULL). |

RETURNVALUE

Token Stream Name

RETURNVALUE

Token Stream Function

Used to send the return value of a RPC to the client. When an RPC is executed the associated parameters may be defined as input or output (or "return") parameters. This token is used to send a description of the return parameter to the client. This token is also used to describe the value returned by a User Defined Function (UDF) when executed as an RPC. This token is also sent back for EXEC statements within a batch for TDS 4.2. drivers.

Token Stream Comments

The token value is 0 xAC/172.

Multiple return values may exist per RPC. There is a □eparate RETURNVALUE token sent for each parameter returned.

Return parameters are sent in the order they are defined in the procedure.

A UDF cannot have return parameters. As such, if a UIDF is executed as an RPC there is exactly one RETURN-VALUE token sent to the client.

---

Token Stream Specific Rules

```
TokenType            :=BYTE;
ParamName            :=B_VARCHAR;
Status               :=BYTE;
UserType             :=USHORT;
fNullable            :=BIT;
fCaseSen             :=BIT;
usUpdateable         :=BIT, BIT; //2-bit value
                       //0 = ReadOnly
                       //1 = ReadWrite
                       //2 = Unknown (maybe readonly,
                           maybe readwrite)
fIdentity            :=BIT;
fComputed            :=BIT;
usReservedODBC       :=BIT, BIT;
fFixedLenCLRType     :=BIT;
usReserved           :=BIT, BIT, BIT, BIT, BIT, BIT;
Flags                :=fNullable, fCaseSen, usUpdateable,
                       fIdentity, fComputed,
                           usReservedODBC, fFixedLenCLRType,
                           usReserved, fUnset;
TypeInfo             :=TYPE INFO;
Value                :=TYPE VARBYTE;
```

Token Stream Definition

```
RETURNVALUE          :=TokenType,
                       ParamName,
```

-continued

```
Status,
UserType,
Flags,
TypeInfo,
Value;
```

TABLE 26

Token Stream Parameter Details

| Parameter | Description |
|---|---|
| TokenType | RETURNVALUE_TOKEN |
| ParamName | The parameter name length and parameter name (within B_VARCHAR) |
| Status | |
| UserType | The user-defined data type of the column. |
| Flags | Bit flags in least significant bit order:<br>fCaseSensitive is a bit flag, TRUE if the column is case sensitive for searches. (Not implemented in MS SQL Server).<br>fNullable is a bit flag, TRUE if the column is nullable.<br>fUpdateable is a 2 bit field, 0 if column is read-only, 1 if column is read/write and 2 if updateable is unknown. (Not implemented in MS SQL Server).<br>fIdentity is a bit flag, TRUE if the column is an identity column.<br>fReservedODBC is a 2 bit field that is used by ODS gateways supporting the ODBC ODS gateway driver. |
| TypeInfo | The TYPE_INFO for the message |
| Value | Contains the type dependant data for the parameter (within TYPE_VARBYTE). |

ROW

Token Stream Name

ROW

Token Stream Function

Used to send a complete row, as defined by the COLMETADATA token, to the client.

Token Stream Comments
    The token value is 0xD1/209

```
Token Stream Specific Rules

TokenType         :=BYTE;
TextPointer       :=B_VARBYTE;
Timestamp         :=8 * BYTE;
Data              :=TYPE_VARBYTE;
ColumnData        :=[TextPointer, TimeStamp],
                    Data;
AllColumnData     :={ColumnData};
[Note: "ColumnData" is repeated once for each column of data]
Token Stream Definition ROW               :=TokenType,
                    AllColumnData;
```

TABLE 27

Token Stream Parameter Details

| Parameter | Description |
|---|---|
| TokenType | ROW_TOKEN |
| TextPointer | The length of the text pointer and the text pointer (within B_VARBYTE) for Data. |

TABLE 27-continued

Token Stream Parameter Details

| Parameter | Description |
|---|---|
| Timestamp | The timestamp of a text/image column. This is not present if the value of Data is CHARBIN_NULL or GEN_NULL. |
| Data | The actual data for the column. The TYPE_INFO information describing the datatype of this data is given in the preceding COLMETADATA_TOKEN, ALTMETDATA_TOKEN or OFFSET_TOKEN. |

SSPI

Token Stream Name

SSPI

Token Stream Function

The SSPI token returned during the login process.

Token Stream Comments
    The token value is 0xED/237

Token Stream Specific Rules

```
TokenType                :=BYTE;
SSPIBuffer               :=US_VARBYTE;
Token Stream Definition:

SSPI                     :=TokenType,
                           SSPIBuffer;
```

TABLE 28

Token Stream Parameter Details

| Parameter | Description |
|---|---|
| TokenType | SSPI_TOKEN |
| SSPIBuffer | The length of the SSPI Buffer and the SSPI Buffer (within B_VARBYTE). |

TABNAME

Token Stream Name

TABNAME

Token Stream Function

Used to send the table name to the client only when in browser mode or from sp_cursoropen.

Token Stream Comments
    The token value is 0xA4/164

```
Token Stream Specific Rules

TokenType         :=BYTE;
Length            :=USHORT;
TableName         :=US_VARCHAR;
AllTableNames     :={TableName};
[Note: "TableName" is repeated once for each table name in the query]
Token Stream Definition TABNAME           :=TokenType,
                    Length,
                    AllTableNames;
```

TABLE 29

Token Stream Parameter Details

| Parameter | Description |
|---|---|
| TokenType | TABNAME_TOKEN |
| Length | The total length of the ROW datastream. |
| TableName | The name of the base table referenced in the select statement. |

Datastream Message Grammar

ResultSet

Sub Message Name:

ResultSet

Sub Message Specific Rules:

ResultSet_METADATA := COLMETADATA_TOKEN
  [TABNAME_TOKEN]
  [COLINFO_TOKEN]
  {ALTMETADATA_TOKEN}
  [ORDER_TOKEN];

ResultSet_ROW := ROW_TOKEN
  {ALTROW_TOKEN};

ResultSet_DONE := DONE_TOKEN
  |
  DONEINPROC_TOKEN;

Sub Message Definition

ResultSet := ResultSet_METADATA
  {ResultSet_ROW}
  ResultSet_DONE;

[Note: ResultSet_ROW is repeated "Count" times, where "Count" is specified in the COLMETADATA_TOKEN]

TABLE 30

Sub Message Parameter Details:

| Parameter | | Description |
|---|---|---|
| ResultSet_METADATA | COLMETADATA_TOKEN | "Count" parameter specifies number of times ResultSet_ROW is repeated. |
| | TABNAME_TOKEN | Optional. |
| | COLINFO_TOKEN | Optional. |
| | ALTMETADATA_TOKEN | "Id" parameter references "Id" used in ALTROW_TOKEN (See ResultSet_ROW for more details). |
| | ORDER_TOKEN | Optional. |
| ResultSet_ROW | ROW_TOKEN | Complete row of data, as specified in the COLMETEDATA_TOKEN. |
| | ALTROW_TOKEN | Any "Id" specifed within the ALTMETADATA_TOKEN "Id" parameter may be referenced in an ordered sequence here (see examples for more details). |
| ResultSet_DONE | DONE | The count of rows that were affected by the command. The value of Count is valid if the value of Status includes DONE_COUNT. |
| | DONEINPROC | The count of rows that were affected by the command within a stored procedure. The value of Count is valid if the value of Status includes DONE_COUNT. |

Sub Message Example

| ExampleResultSet | :=COLMETEDATA_TOKEN | (Count=4) |
|---|---|---|
| | ALTMETADATA_TOKEN | (Id=1) |
| | ALTMETADATA_TOKEN | (Id=2) |
| | ROW_TOKEN | (Count=1) |
| | ALTROW_TOKEN | (Id=1) |

-continued

| | |
|---|---|
| ALTROW_TOKEN | (Id=2) |
| ROW_TOKWN | (Count=2) |
| ROW_TOKEN | (Count=3) |
| ALTROW_TOKEN | (Id=2) |
| ROW_TOKEN | (Count=4) |
| ALTROW_TOKEN | (Id=1) |
| DONE_TOKEN; | (DoneRowCount=4 To 8) |

Grammar Definition for Token Description

The Tabular Data Stream consists of a variety of messages. Each message further consists of a set of bytes transmitted in a predefined order. This predefined order or grammar, can be specified using Extended Backus-Naur Form.

| EBNF (ISO/IEC 14977: 1996(E)) General Syntax | |
|---|---|
| [ ... ] | :=Optional Sequence |
| { ... } | :=Repeated Sequence (i.e. repeated zero or more times) |
| { ... } - | :=Repeated Sequence (i.e. repeated one or more times) |
| * | :=Syntactic Factor (i.e. an Integer multiplier >= 1) |
| "" | :=Terminal String (i.e. sequence of one or more chars) |
| "0x00" | :=Hexadecimal Value (i.e. always 1 byte in length) |
| General Rules | |
| BIT | :="bit"; |
| BYTE | :=BIT, BIT, BIT, BIT, BIT, BIT, BIT, BIT; |
| BYTELEN | :=BYTE; |
| USHORT | :=BYTE, BYTE; |
| LONG | :=BYTE, BYTE, BYTE, BYTE; |
| DWORD | :=BYTE, BYTE, BYTE, BYTE; |
| ULONGLONG | :=BYTE, BYTE, BYTE, BYTE, BYTE, BYTE, BYTE, BYTE; |
| UCHAR | :=BYTE; |
| USHORTLEN | :=USHORT; |
| USHORTCHARBINLEN | :=USHORTLEN // valid range is 0-8000 |
| LONGLEN | :=LONG; |
| ULONGLONGLEN := | ULONGLONG; |
| PRECISION | :=BYTE; |
| SCALE | :=BYTE; |
| GEN_NULL | :="0x00"; |

-continued

| | |
|---|---|
| CHARBIN_NULL | :="0xFF", "0xFF"; |
| FRESERVEDBIT | :=BIT; |
| FRESERVEDBYTE | :=BYTE; |
| DBID | :=DWORD; |

[Note: FRESERVEDBIT and FRESERVEDBYTE are often used to pad unused parts of a byte or bytes. The value of these reserved bits should be ignored.]

Collation Rule Definition

The collation rule is used to specify collation information for character data or metadata describing character data.

| | |
|---|---|
| LCID    := | 20 * BIT; |
| fIgnoreCase | :=BIT; |
| fIgnoreAccent | :=BIT; |
| fIgnoreWidth | :=BIT; |
| fIgnoreKana | :=BIT; |
| fBinary | :=BIT; |
| ColFlags :=fIgnoreCase, fIgnoreAccent, fIgnoreWidth, fIgnoreKana, fBinary, | |
| FRESERVEDBIT, FRESERVEDBIT, FRESERVEDBIT; | |
| Version | :=4 * BIT; |
| SortId | :=BYTE; |
| COLLATION | :=LCID, ColFlags, Version, SortId; |
| COLLATION represents either a SQL Server Collation or a Windows Collation. | |

A SQL Server collation is one of a predefined set of sort orders. It is identified by having SortId being non-zero. If this is the case, the following table defines each SortId, including character code page and comparison semantics:

TABLE 31

| Sort order ID | SQL collation name |
|---|---|
| 30 | Binary order, for use with the 437 (U.S. English) character set. |
| 31 | Dictionary order, case-sensitive, for use with the 437 (U.S. English) character set. |
| 32 | Dictionary order, case-insensitive, for use with the 437 (U.S. English) character set. |
| 33 | Dictionary order, case-insensitive, uppercase preference, for use with the 437 (U.S. English) character set. |
| 34 | Dictionary order, case-insensitive, accent-insensitive, for use with the 437 (U.S. English) character set. |
| 40 | Binary order, for use with the 850 (Multilingual) character set. |
| 41 | Dictionary order, case-sensitive, for use with the 850 (Multilingual) character set. |
| 42 | Dictionary order, case-insensitive, for use with the 850 (Multilingual) character set. |
| 43 | Dictionary order, case-insensitive, uppercase preference, for use with the 850 (Multilingual) character set. |
| 44 | Dictionary order, case-insensitive, accent-insensitive, for use with the 850 (Multilingual) character set. |

TABLE 31-continued

Sort order ID SQL collation name

| | |
|---|---|
| 49 | Strict compatibility with version 1.x case-insensitive databases, for use with the 850 (Multilingual) character set. |
| 50 | Binary order for use with 1252 character set. |
| 51 | Dictionary order, case-sensitive, for use with 1252 character set. |
| 52 | Dictionary order, case-insensitive, for use with 1252 character set. |
| 53 | Dictionary order, case-insensitive, uppercase preference, for use with 1252 character set. |
| 54 | Dictionary order, case-insensitive, accent-insensitive, for use with 1252 character set. |
| 55 | Alternate dictionary order, case-sensitive, for use with the 850 (Multilingual) character set. |
| 56 | Alternate dictionary order, case-insensitive, uppercase preference, for use with the 850 (Multilingual) character set. |
| 57 | Alternate dictionary order, case-insensitive, accent-insensitive, for use with the 850 (Multilingual) character set. |
| 58 | Scandinavian dictionary order, case-insensitive, uppercase preference, for use with the 850 (Multilingual) character set. |
| 59 | Scandinavian dictionary order, case-sensitive, for use with the 850 (Multilingual) character set. |
| 60 | Scandinavian dictionary order, case-insensitive, for use with the 850 (Multilingual) character set. |
| 61 | Alternate dictionary order, case-insensitive, for use with the 850 (Multilingual) character set. |
| 71 | Latin-1 case-sensitive, for use with 1252 character set. |
| 72 | Latin-1 case-insensitive, for use with 1252 character set. |
| 73 | Danish/Norwegian case-sensitive sort order for code page 1252. |
| 74 | Finnish/Swedish case-sensitive sort order for code page 1252. |
| 75 | Icelandic case-sensitive sort order for code page 1252. |
| 80 | Binary order, for use with the 1250 (Central European) character set. |
| 81 | Dictionary order, case-sensitive, for use with the 1250 (Central European) character set. |
| 82 | Dictionary order, case-insensitive, for use with the 1250 (Central European) character set. |
| 83 | Czech dictionary order, case-sensitive, for use with the 1250 (Central European) character set. |
| 84 | Czech dictionary order, case-insensitive, for use with the 1250 (Central European) character set. |
| 85 | Hungarian dictionary order, case-sensitive, for use with the 1250 (Central European) character set. |
| 86 | Hungarian dictionary order, case-insensitive, for use with the 1250 (Central European) character set. |
| 87 | Polish dictionary order, case-sensitive, for use with the 1250 (Central European) character set. |
| 88 | Polish dictionary order, case-insensitive, for use with the 1250 (Central European) character set. |
| 89 | Romanian dictionary order, case-sensitive, for use with the 1250 (Central European) character set. |
| 90 | Romanian dictionary order, case-insensitive, for use with the 1250 (Central European) character set. |
| 91 | Croatian dictionary order, case-sensitive, for use with the 1250 (Central European) character set. |
| 92 | Croatian dictionary order, case-insensitive, for use with the 1250 (Central European) character set. |
| 93 | Slovak dictionary order, case-sensitive, for use with the 1250 (Central European) character set. |
| 94 | Slovak dictionary order, case-insensitive, for use with the 1250 (Central European) character set. |
| 95 | Slovenian dictionary order, case-sensitive, for use with the 1250 (Central European) character set. |
| 96 | Slovenian dictionary order, case-insensitive, for use with the 1250 (Central European) character set. |
| 97 | Windows Polish case-sensitive sort order for code page 1250. |
| 98 | Windows Polish case-insensitive sort order for code page 1250. |
| 104 | Binary order, for use with the 1251 (Cyrillic) character set. |
| 105 | Dictionary order, case-sensitive, for use with the 1251 (Cyrillic) character set. |
| 106 | Dictionary order, case-insensitive, for use with the 1251 (Cyrillic) character set. |
| 107 | Ukrainian dictionary order, case-sensitive, for use with the 1251 (Cyrillic) character set. |
| 108 | Ukrainian dictionary order, case-insensitive, for use with the 1251 (Cyrillic) character set. |
| 112 | Binary order, for use with the 1253 (Greek) character set. |
| 113 | Dictionary order, case-sensitive, for use with the 1253 (Greek) character set. |
| 114 | Dictionary order, case-insensitive, for use with the 1253 (Greek) character set. |

TABLE 31-continued

| Sort order ID | SQL collation name |
|---|---|
| 120 | Mixed dictionary order, for use with the 1253 (Greek) character set. |
| 121 | Dictionary order, case-sensitive, accent-sensitive, for use with the 1253 (Greek) character set. |
| 124 | Dictionary order, case-insensitive, accent-insensitive, for use with the 1253 (Greek) character set. |
| 128 | Binary order, for use with the 1254 (Turkish) character set. |
| 129 | Dictionary order, case-sensitive, for use with the 1254 (Turkish) character set. |
| 130 | Dictionary order, case-insensitive, for use with the 1254 (Turkish) character set. |
| 136 | Binary order, for use with the 1255 (Hebrew) character set. |
| 137 | Dictionary order, case-sensitive, for use with the 1255 (Hebrew) character set. |
| 138 | Dictionary order, case-insensitive, for use with the 1255 (Hebrew) character set. |
| 144 | Binary order, for use with the 1256 (Arabic) character set. |
| 145 | Dictionary order, case-sensitive, for use with the 1256 (Arabic) character set. |
| 146 | Dictionary order, case-insensitive, for use with the 1256 (Arabic) character set. |
| 152 | Binary order, for use with the 1257 (Baltic) character set. |
| 153 | Dictionary order, case-sensitive, for use with the 1257 (Baltic) character set. |
| 154 | Dictionary order, case-insensitive, for use with the 1257 (Baltic) character set. |
| 155 | Estonian dictionary order, case-sensitive, for use with the 1257 (Baltic) character set. |
| 156 | Estonian dictionary order, case-insensitive, for use with the 1257 (Baltic) character set. |
| 157 | Latvian dictionary order, case-sensitive, for use with the 1257 (Baltic) character set. |
| 158 | Latvian dictionary order, case-insensitive, for use with the 1257 (Baltic) character set. |
| 159 | Lithuanian dictionary order, case-sensitive, for use with the 1257 (Baltic) character set. |
| 160 | Lithuanian dictionary order, case-insensitive, for use with the 1257 (Baltic) character set. |
| 183 | Danish/Norwegian dictionary order, case-insensitive, uppercase preference, for use with 1252 character set. |
| 184 | Swedish/Finnish (Standard) dictionary order, case-insensitive, uppercase preference, for use with 1252 character set. |
| 185 | Swedish/Finnish (Phone) dictionary order, case-insensitive, uppercase preference, for use with 1252 character set. |
| 186 | Icelandic dictionary order, case-insensitive, uppercase preference, for use with 1252 character set. |
| 192 | Binary order, for use with the 932 (Japanese) character set. |
| 193 | Dictionary order, case-insensitive, for use with the 932 (Japanese) character set |
| 194 | Binary order, for use with the 949 (Korean) character set. |
| 195 | Dictionary order, case-insensitive, for use with the 949 (Korean) character set. |
| 196 | Binary order, for use with the 950 (Traditional Chinese) character set. |
| 197 | Dictionary order, case-insensitive, for use with the 950 (Traditional Chinese) character set. |
| 198 | Binary order, for use with the 936 (Simplified Chinese) character set. |
| 199 | Dictionary order, case-insensitive, for use with the 936 (Simplified Chinese) character set. |
| 200 | Dictionary order, case-sensitive, for use with the 932 (Japanese) character set. |
| 201 | Dictionary order, case-sensitive, for use with the 949 (Korean) character set. |
| 202 | Dictionary order, case-sensitive, for use with the 950 (Traditional Chinese) character set. |
| 203 | Dictionary order, case-sensitive, for use with the 936 (Simplified Chinese) character set. |
| 204 | Binary order, for use with the 874 (Thai) character set. |
| 205 | Dictionary order, case-insensitive, for use with the 874 (Thai) character set. |
| 206 | Dictionary order, case-sensitive, for use with the 874 (Thai) character set. |

For a windows collation (Sortid=0), the LCID bits correspond to a LocaleId as defined by the National Language Support (NLS) functions in Windows.

The GetLocaleInfo windows api can be used to retrieve information about the locale. In particular, querying for the LOCALE_IDEFAULTANSICODEPAGE retrieves the code page information for the given locale.

For either collation type, the different comparison flags map to those defined as valid comparison flags for the comparestring windows api.

However for SQL collations with non-unicode data, the sort order id should be used to derive comparison information flags.

Appendix A

Text & Image Types:

| | | |
|---|---|---|
| TEXTTYPE | :='0x23' | TEXT – |
| IMAGETYPE | :='0x22' | IMAGE |
| NTEXTTYPE | :='0x63' | NTEXT – |

Character & Binary Types:

| | | | |
|---|---|---|---|
| VARBINARYTYPE | :='0x25' | VARBINARY | |
| VARCHARTYPE | :='0x27' | VARCHAR | |
| BINARYTYPE | :='0x2d' | BINARY | |
| CHARTYPE | :='0x2f' | CHAR | |
| BIGVARBINTYPE | :='0xA5' | BIGVARBINARY | |
| BIGVARCHRTYPE | :='0xA7' | BIGVARCHAR | – |
| BIGBINARYTYPE | :='0xAD' | BIGBINARY | |
| BIGCHARTYPE | :='0xAF' | BIGCHAR | – |
| NVARCHARTYPE | :='0xe7' | NVARCHAR | – |
| NCHARTYPE | :='0xef' | NCHAR | – |

Other Types:

| | | | |
|---|---|---|---|
| NULLTYPE | :='0x1f' | VOID | + |
| GUIDTYPE | :='0x24' | UNIQUEIDENTIFIER | + |
| INTNTYPE | :='0x26' | INTN | + |
| INT1TYPE | :='0x30' | INT1 | + |
| BITTYPE | :='0x32' | BIT | + |
| INT2TYPE | :='0x34' | INT2 | + |
| DECIMALTYPE | :='0x37' | DECIMAL | + |
| INT4TYPE | :='0x38' | INT4 | + |
| DATETIM4TYPE | :='0x3a' | ? | + |
| FLT4TYPE | :='0x3b' | ? | + |
| MONEYTYPE | :='0x3c' | MONEY | + |
| DATETIMETYPE | :='0x3d' | DATETIME | + |
| FLT8TYPE | :='0x3e' | FLT8 | + |
| NUMERICTYPE | :='0x3f' | NUMERIC | + |
| SSVARIANTTYPE | :='0x62' | SQLVARIANT | |
| BITNTYPE | :='0x68' | BITN | + |
| DECIMALN | :='0x6a' | DECIMALN | + |
| NUMERICNTYPE | :='0x6c' | NUMERICN | + |
| FLTNTYPE | :='0x6d' | FLTN | + |
| MONEYNTYPE | :='0x6e' | MONEYN | + |
| DATETIMNTYPE | :='0x6f' | DATETIMEN | + |
| MONEY4TYPE | :='0x7a' | ? | + |
| INT8TYPE | :='0x7f' | INT8 | + |
| UDTTYPE | :='0xF0' | CLR UDTs | |
| XMLTYPE | :='0xf1' | XML | |

Figure 11:
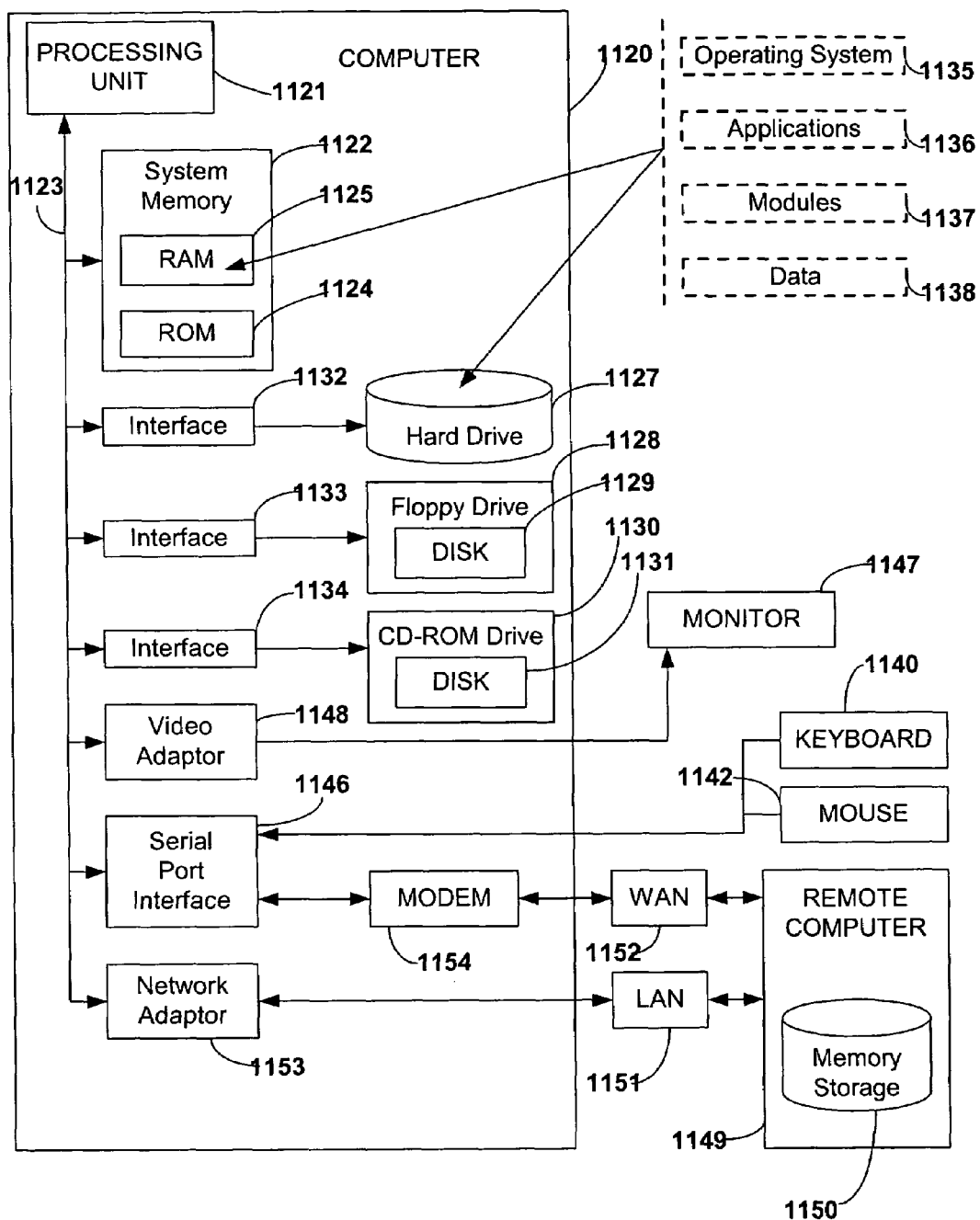
FIG. 11 is a schematic diagram illustrating a suitable computing environment on the server or client side in accordance with an aspect of the present invention.

Referring now to FIG. 11, a brief, general description of a suitable computing environment on the client as well as the server side is illustrated wherein the various aspects of the present invention can be implemented. While the invention has been described above in the general context of computer-executable instructions of a computer program that runs on a computer and/or computers, those skilled in the art will recognize that the invention can also be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like. As explained earlier, the illustrated aspects of the invention can also be practiced in distributed computing environments where tasks are performed by remote processing devices that are linked through a communications network. However, some, if not all aspects of the invention can be practiced on stand-alone computers. In a distributed computing environment, program modules can be located in both local and remote memory storage devices. The exemplary includes a computer 1120, including a processing unit 1121, a system memory 1122, and a system bus 1123 that couples various system components including the system memory to the processing unit 1121. The processing unit 1121 may be any of various commercially available processors. Dual microprocessors and other multi-processor architectures also can be used as the processing unit 1121.

The system bus may be any of several types of bus structure including a memory bus or memory controller, a peripheral bus, and a local bus using any of a variety of commercially available bus architectures. The system memory may include read only memory (ROM) 1124 and random access memory (RAM) 1125. A basic input/output system (BIOS), containing the basic routines that help to transfer information between elements within the computer 1120, such as during start-up, is stored in ROM 1124.

The computer 1120 further includes a hard disk drive 1127, a magnetic disk drive 1128, e.g., to read from or write to a removable disk 1129, and an optical disk drive 1130, e.g., for reading from or writing to a CD-ROM disk 1131 or to read from or write to other optical media. The hard disk drive 1127, magnetic disk drive 1128, and optical disk drive 1130 are connected to the system bus 1123 by a hard disk drive interface 1132, a magnetic disk drive interface 1133, and an optical drive interface 1134, respectively. The drives and their associated computer-readable media provide non-volatile storage of data, data structures, computer-executable instructions, etc. for the computer 1120. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules can be stored in the drives and RAM 1125, including an operating system 1135, one or more application programs 1136, other program modules 1137, and program data 1138. The operating system 1135 in the illustrated computer can be substantially any commercially available operating system.

A user can enter commands and information into the computer 1120 through a keyboard 1140 and a pointing device, such as a mouse 1142. Other input devices (not shown) can include a microphone, a joystick, a game pad, a satellite dish, a scanner, or the like. These and other input devices are often connected to the processing unit 1121 through a serial port interface 1146 that is coupled to the system bus, but may be connected by other interfaces, such as a parallel port, a game port or a universal serial bus (USB). A monitor 1147 or other type of display device is also connected to the system bus 1123 via an interface, such as a video adapter 1148. In addition to the monitor, computers typically include other peripheral output devices (not shown), such as speakers and printers.

The computer 1120 may operate in a networked environment using logical connections to one or more remote computers, such as a remote computer 1149. The remote computer 1149 may be a workstation, a server computer, a router, a peer device or other common network node, and typically includes many or all of the elements described relative to the computer 1120, although only a memory storage device 1150 is illustrated in FIG. 11. The logical connections depicted in FIG. 11 may include a local area network (LAN) 1151 and a wide area network (WAN) 1152. Such networking environments are commonplace in offices, enterprise-wide computer networks, Intranets and the Internet.

When employed in a LAN networking environment, the computer 1120 can be connected to the local network 1151 through a network interface or adapter 1153. When utilized in a WAN networking environment, the computer 1120 generally can include a modem 1154, and/or is connected to a communications server on the LAN, and/or has other means for establishing communications over the wide area network 1152, such as the Internet. The modem 1154, which can be internal or external, may be connected to the system bus 1123 via the serial port interface 1146. In a networked environment, program modules depicted relative to the computer 1120, or portions thereof, can be stored in the remote memory storage device. It will be appreciated that the network connections shown are exemplary and other means of establishing a communications link between the computers may be employed.

In accordance with the practices of persons skilled in the art of computer programming, the present invention has been described with reference to acts and symbolic representations of operations that are performed by a computer, such as the computer 1120, unless otherwise indicated. Such acts and operations are sometimes referred to as being computer-executed. It will be appreciated that the acts and symbolically represented operations include the manipulation by the processing unit 1121 of electrical signals representing data bits which causes a resulting transformation or reduction of the electrical signal representation, and the maintenance of data bits at memory locations in the memory system (including the system memory 1122, hard drive 1127, floppy disks 1129, and CD-ROM 1131) to thereby reconfigure or otherwise alter the computer system's operation, as well as other processing of signals. The memory locations wherein such data bits are maintained are physical locations that have particular electrical, magnetic, or optical properties corresponding to the data bits.

Figure 12:
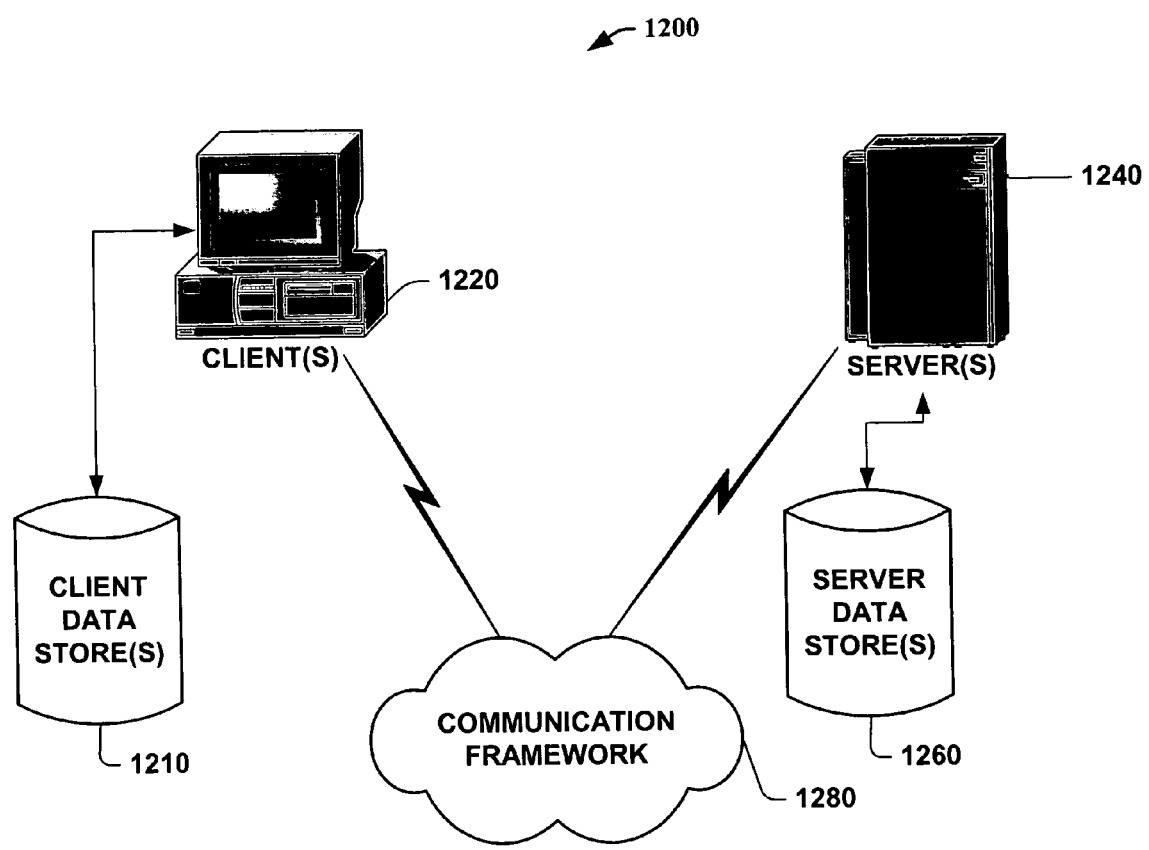
FIG. 12 illustrates a diagram for a network environment that employs a TDS protocol according to the present invention.

Referring now to FIG. 12, a client-server system 1200 that employs a TDS protocol according to one aspect of the present invention is illustrated. The client(s) 1220 can be hardware and/or software (e.g., threads, processes, computing devices). The system 1200 also includes one or more server(s) 1240. The server(s) 1240 can also be hardware and/or software (e.g., threads, processes, computing devices). For example, such servers 1240 can house threads to perform transformations by employing the present invention. The client 1220 and the server 1240 can communicate, in the form of data packets transmitted according to the present invention, between two or more computer processes. As illustrated, the system 1200 includes a communication framework 1280 that can facilitate communications between the client(s) 1220 and the server(s) 1240. The client(s) 1220 is operationally connected to one or more client data store(s) 1210 that can store information local to the client(s) 1220. Moreover, client 1220 can access and update databases 1260 located on a server computer 1240 running a server process. In one aspect of the present invention, the communication frame work 1280 can be the internet, with the client process being a Web browser and the server process being a Web server. As such, a typical client 1220 can be a general purpose computer, such as a conventional personal computer having a central processing unit (CPU), system memory a modem or network card for connecting the personal computer to the Internet, and a display as well as other components such as a keyboard, mouse, and the like. Likewise a typical server 1240 can be university or corporate mainframe computers, or dedicated workstations, and the like.

Although the invention has been shown and described with respect to certain illustrated aspects, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention. Furthermore, to the extent that the terms "includes", "including", "has", "having", and variants thereof are used in either the detailed description or the claims, these terms are intended to be inclusive in a manner similar to the term "comprising."

What is claimed is:

1. A computer-implemented system to facilitate communication between a client device and a server device comprising:
   a tabular data stream (TDS) protocol that comprises:
      a multiple active result set (MARS) header,
      a data field that is part of the MARS header and identifies a number of pending requests known by the client device to the server device, the MARS header is employed to transmit, to the server device, the number of pending requests known by the client device to facilitate synchronization of execution of queries to facilitate communication between the client device and the server device, based at least in part on the number of pending requests known by the client device, regardless of respective buffer sizes for the client device and the server device, and
   the TDS protocol further comprises a chunk format component that employs a Partially Length Prefixed (PLP) format to transmit data between the client device and the server device, and the chunk format component further employs a special length designator that is communicated to the client device and indicates that a total value of a length of a data stream is not known and the data stream is to be transmitted in multiple data stream packets.

2. The system of claim 1, the TDS protocol further comprises a transaction descriptor header that enables a plurality of active transactions under a single session.

3. The system of claim 1 the TDS protocol further comprises at least one of a transaction state component, reset component, or database mirroring component, or a combination thereof, that send information to the client device when a transactional state of the server device changes.

4. The system of claim 3, the state of the server device changes when a connection is reset to another server device as part of a data base mirror environment.

5. The system of claim 3, the database mirroring component enables an application and a client driver to implement a transparent client redirect.

6. The system of claim 1, the client device cancels a command being currently executed via transmittal of a non severe attention signal without a connection drop of the communication.

7. The system of claim 1, the client device executes a remote procedure call on the server device.

8. The system of claim 1, the client device requests a connection to enlist in a distributed transaction coordinator (DTC).

9. The system of claim 1, the TDS protocol enables a change of order for parameters outputted from the server device, and retrieval of parameters from an application programming interfitee (API) of the network environment.

10. The system of claim 1, the TDS protocol specifies a new password as part of a login procedure when an old password is presented.

11. The system of claim 1, the TDS protocol further comprising a versioning component that employs a data character scheme to determine a version of a TDS protocol common to the server device and the client device.

12. The system of claim 11, the versioning component determines a version of a TDS protocol common to the server device and the client device based on chronological versioning and software versioning.

13. The system of claim 11, the versioning component enables at least one of a down level client device or a new client device to communicate with at least one of a down level server device or a new server device.

14. A computer-implemented system that facilitates communication in client/server networks comprising:
a server device in communication with a client device via a tabular data stream (TDS) protocol in a network environment; and
the TDS protocol comprising:
a query notification header with a data field that requests updates related to a query at a time the communication is initially established to facilitate communication between the server device and the client device, the updates comprise information associated with at least a change to the query, and
the TDS protocol further comprises a chunk format component that employs a Partially Length Prefixed (PLP) format to transmit data between the client device and the server device, and the chunk format component further employs a special length designator that is communicated to the client device and indicates that a total value of a length of a data stream is not known and the data stream is to be transmitted in multiple data stream packets.

15. The system of claim 14 the query notification header estabiishes channels and setup for the updates sent by the server device to the client device.

16. The system of claim 14, the query notification header enables at least one of an infrastructure component that can facilitate development of caching layers on top of SQL server applications or the creation of middle tier type caches that remain transparent to the client device, or a combination thereof.

17. A computer-implemented system that facilitates communication between a client device and a server device comprising:
means for issuing a query by the client device;
means for processing the query by the server device; and
means for communicating via a tabular data stream (TDS) protocol in a network environment, comprising:
means for communicating to the server device a number of pending requests known by the client device,
means for sending the query results to the client device such that the client device and server device are synchronized, based in part on a number of pending requests known by the client device, regardless of respective buffer sizes associated with the client device and the server device, and
means for transmitting data between the client device and the server device using a Partially Length Prefixed (PLP) format, the means for transmitting data between the client device and the server device using the PLP format further employing a special length designator that is communicated to the client device and indicating that a total value of a length of a data stream is not known and the data stream is to be transmitted in multiple data stream packets.

* * * * *